United States Patent [19]
Recalde

[11] Patent Number: 4,917,540
[45] Date of Patent: * Apr. 17, 1990

[54] PIPELINE LAYING SYSTEM AND VESSEL WITH PIPELINE STRAIGHTENING AND TENSIONING DEVICE

[75] Inventor: Carlos E. Recalde, Irvine, Calif.

[73] Assignee: Santa Fe International Corporation, Alhambra, Calif.

[*] Notice: The portion of the term of this patent subsequent to Feb. 9, 2005 has been disclaimed.

[21] Appl. No.: 268,237

[22] Filed: Nov. 7, 1988

Related U.S. Application Data

[60] Division of Ser. No. 48,454, May 11, 1987, Pat. No. 4,820,082, which is a continuation of Ser. No. 757,790, Jul. 22, 1985, abandoned, which is a continuation-in-part of Ser. No. 646,112, Aug. 31, 1984, Pat. No. 4,687,376.

[51] Int. Cl.⁴ .......................... F16L 1/04; B63B 35/04
[52] U.S. Cl. .................................... 405/168; 405/166; 72/161; 254/134.3 SC
[58] Field of Search ............... 405/158, 166, 168, 169, 405/177, 178; 72/161; 254/134.3 R, 134.3 SC, 134.3 CL, 374, 393; 242/157 R, 157.1, 158.3; 226/153, 190, 193, 196

[56] References Cited

U.S. PATENT DOCUMENTS

| | | | |
|---|---|---|---|
| 518,403 | 4/1894 | Haas | 72/164 X |
| 2,569,266 | 9/1951 | Thompson | 72/166 |
| 3,372,461 | 3/1968 | Tesson | 405/168 X |
| 3,685,306 | 8/1972 | Mott | 405/168 |
| 4,269,540 | 5/1981 | Uyeda et al. | 405/168 |
| 4,723,874 | 2/1988 | Recalde | 405/168 |

FOREIGN PATENT DOCUMENTS 1339654 12/1973 United Kingdom.

Primary Examiner—Randolph A. Reese
Assistant Examiner—John Ricci
Attorney, Agent, or Firm—Harris, Kern, Wallen & Tinsley

[57] ABSTRACT

A pipelaying system adapted for deployment on a vessel for use in a body of water and having at least one reel for storage and layout of a rigid walled pipeline and including pipe take-off drum for mounting on the vessel for rotation about a horizontal drum axis, a pipe take-off structure pivotally mounted on the axis of rotation of the drum, and a drive unit operably connected to the reel and adapted to permit control of the rate of layout of the pipeline, with the vessel convertible between a pivotal ramp type and an arcuate type.

10 Claims, 16 Drawing Sheets

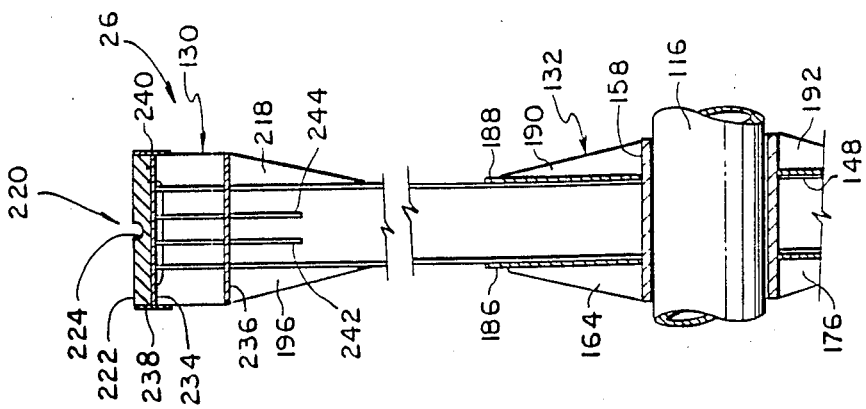
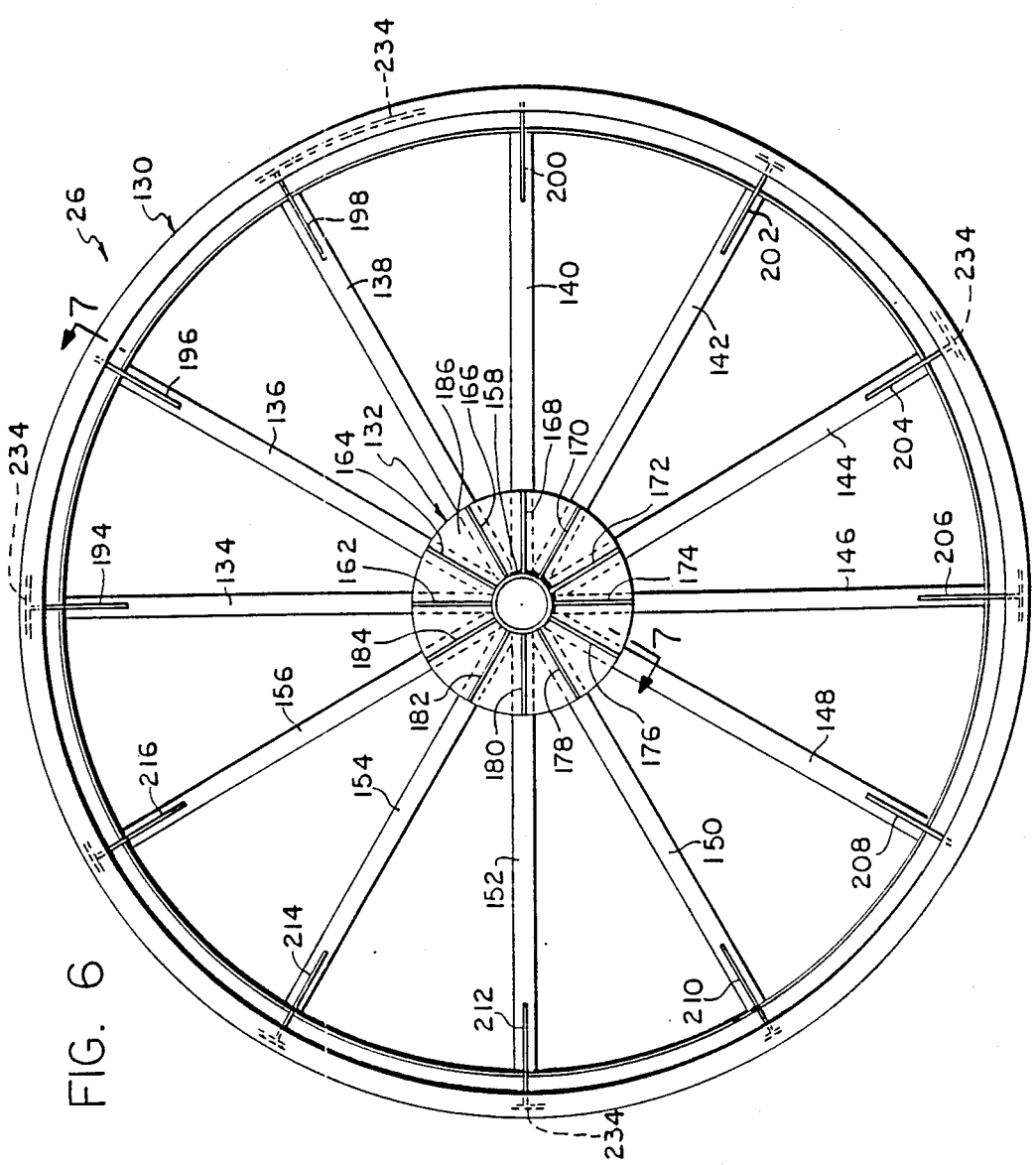

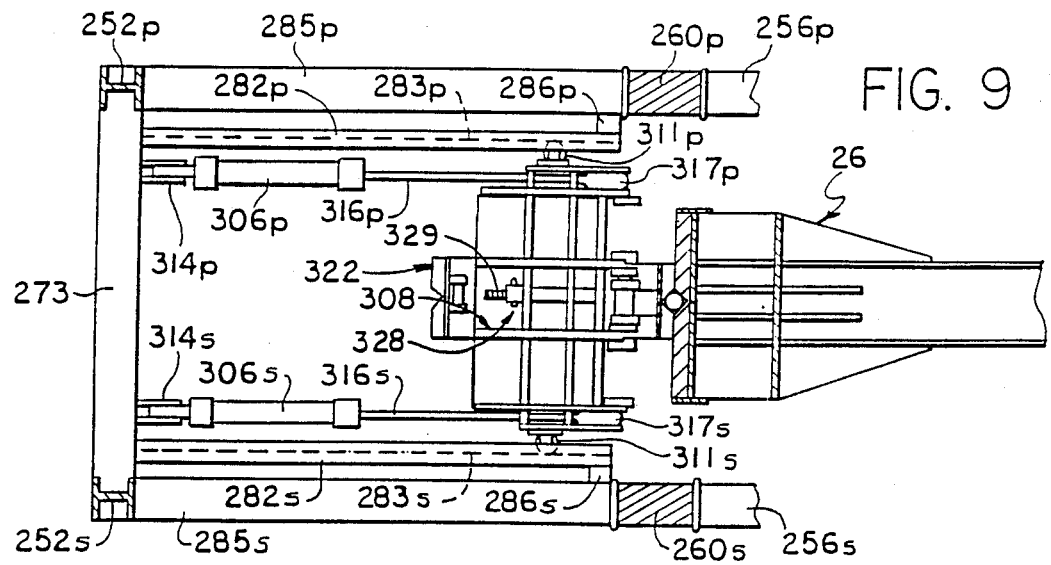
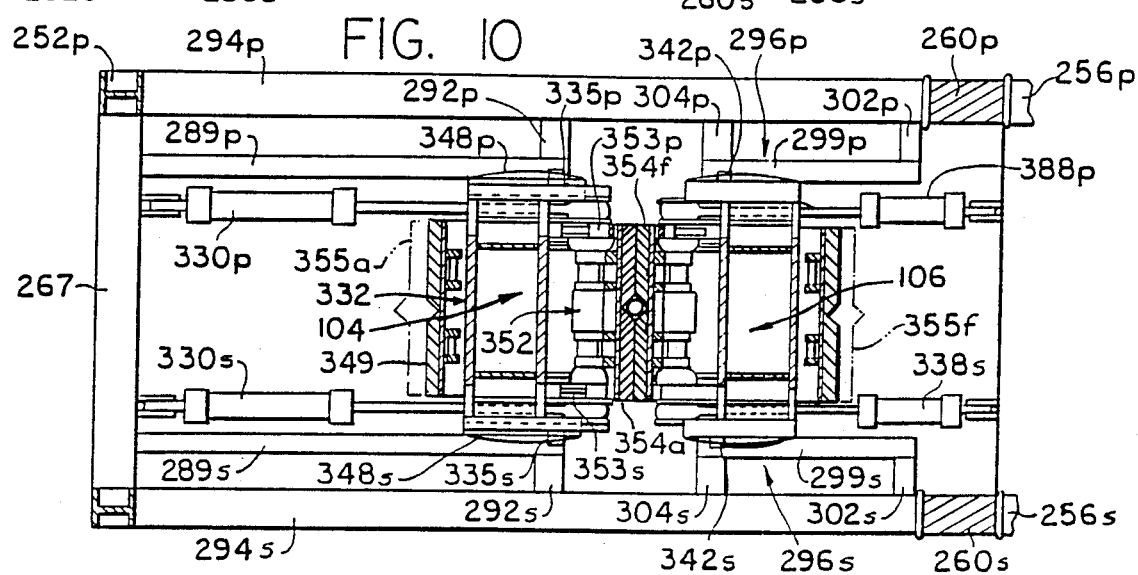
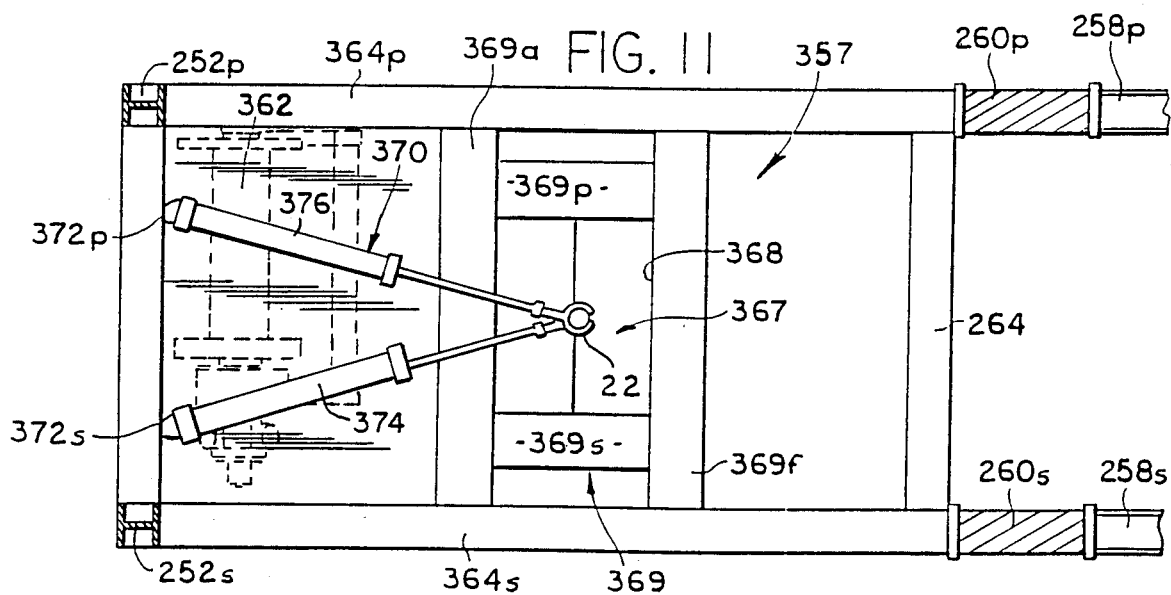

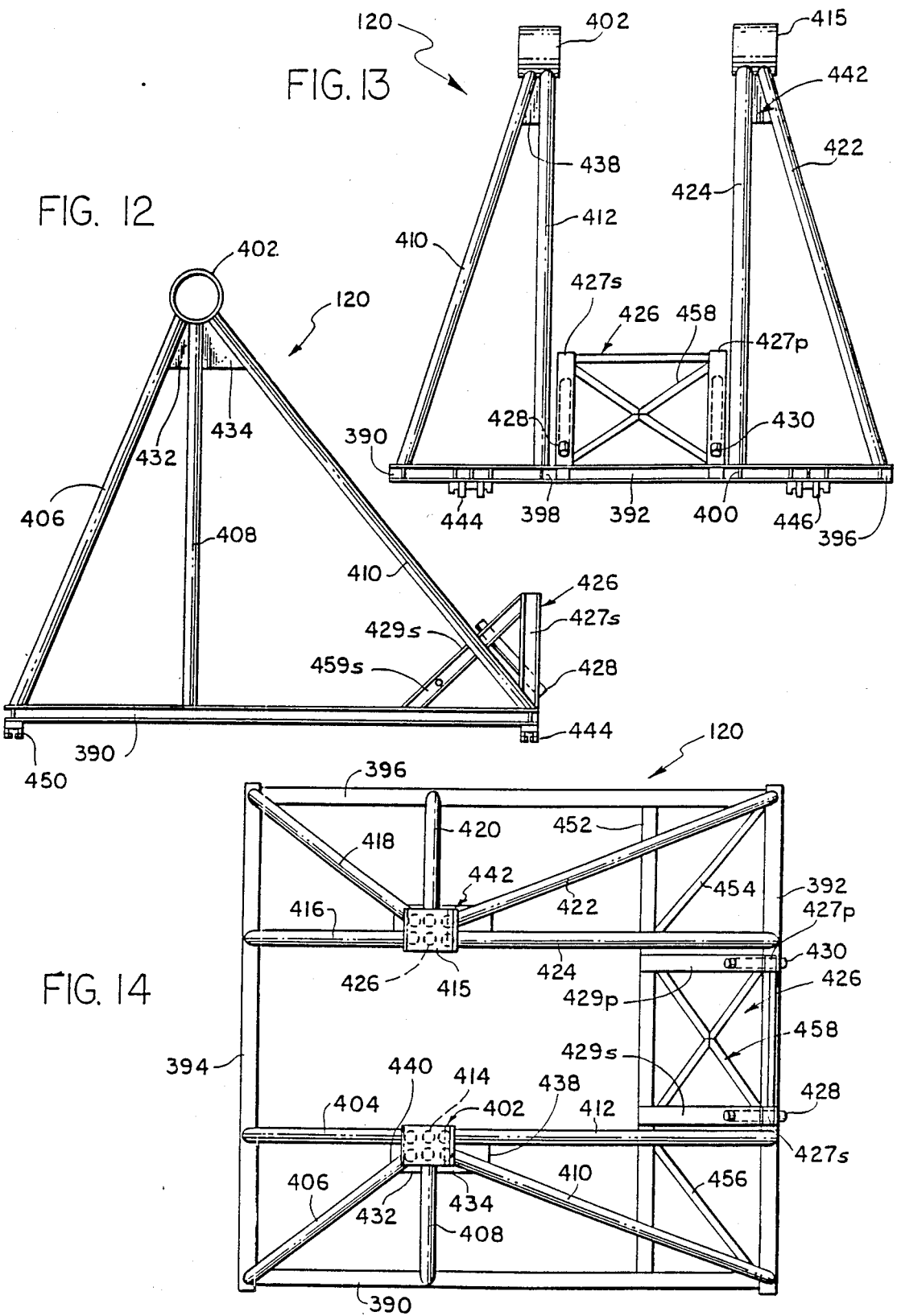

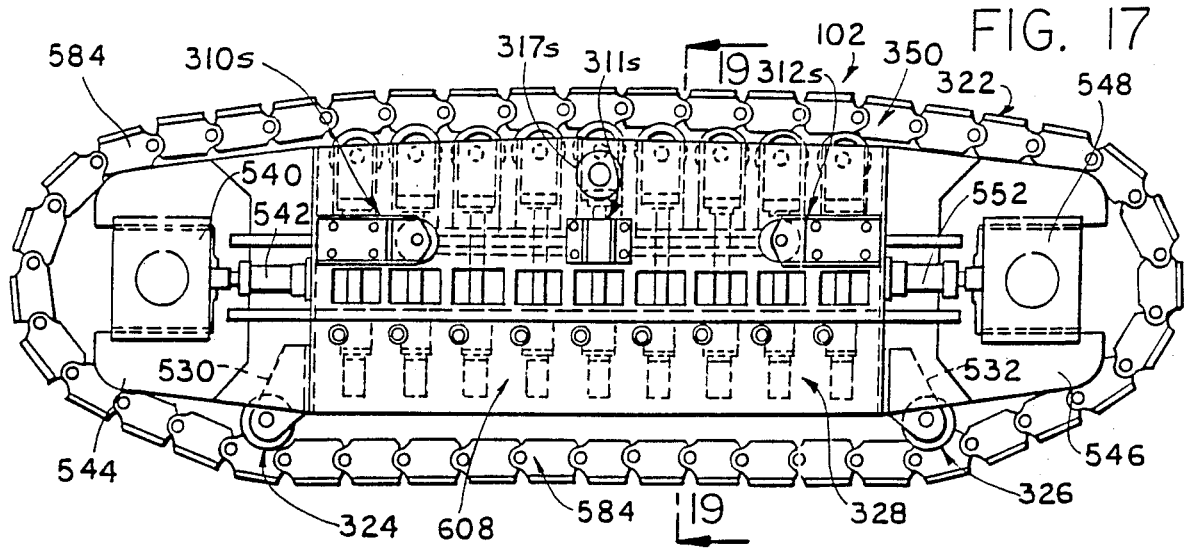
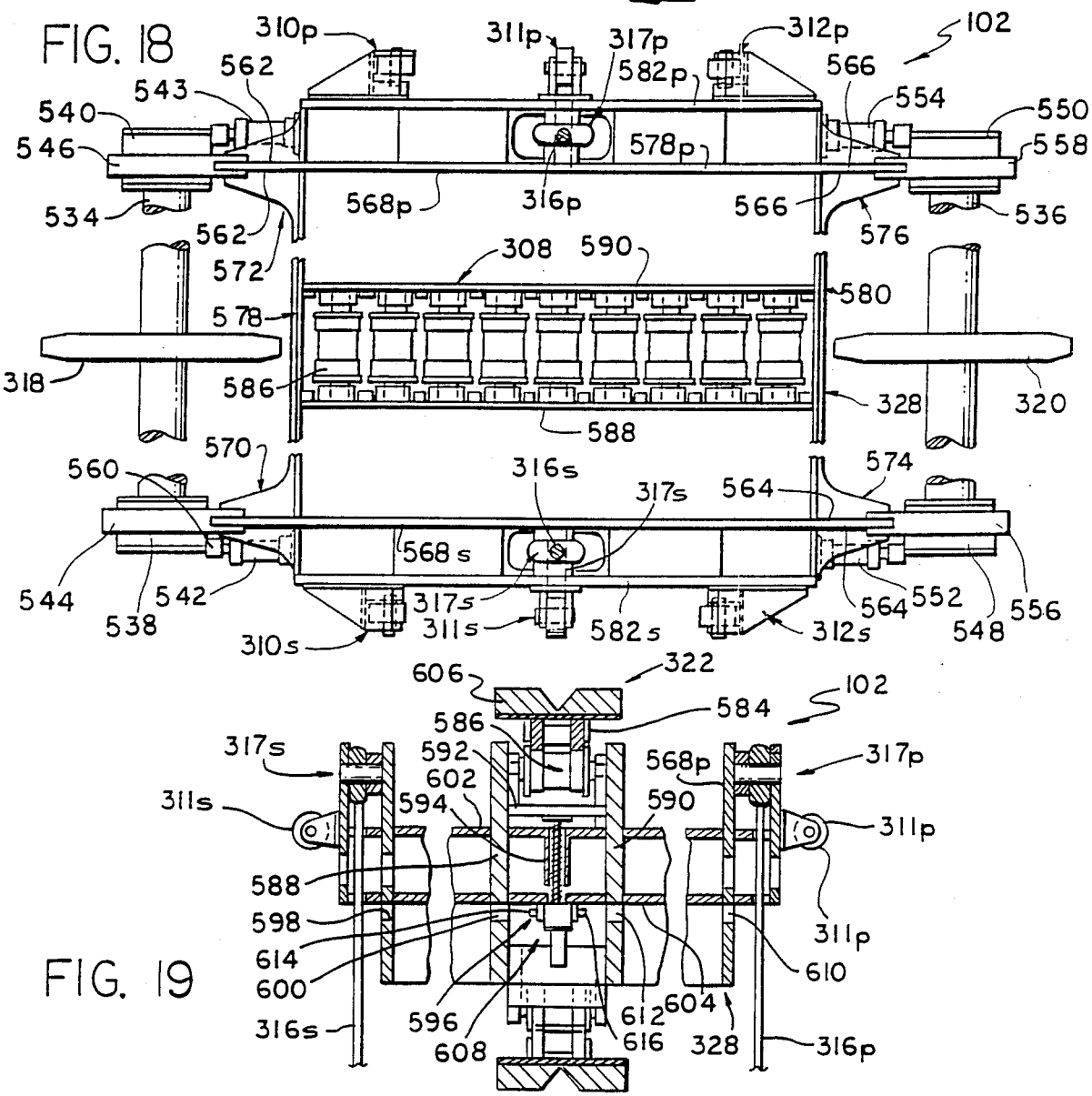

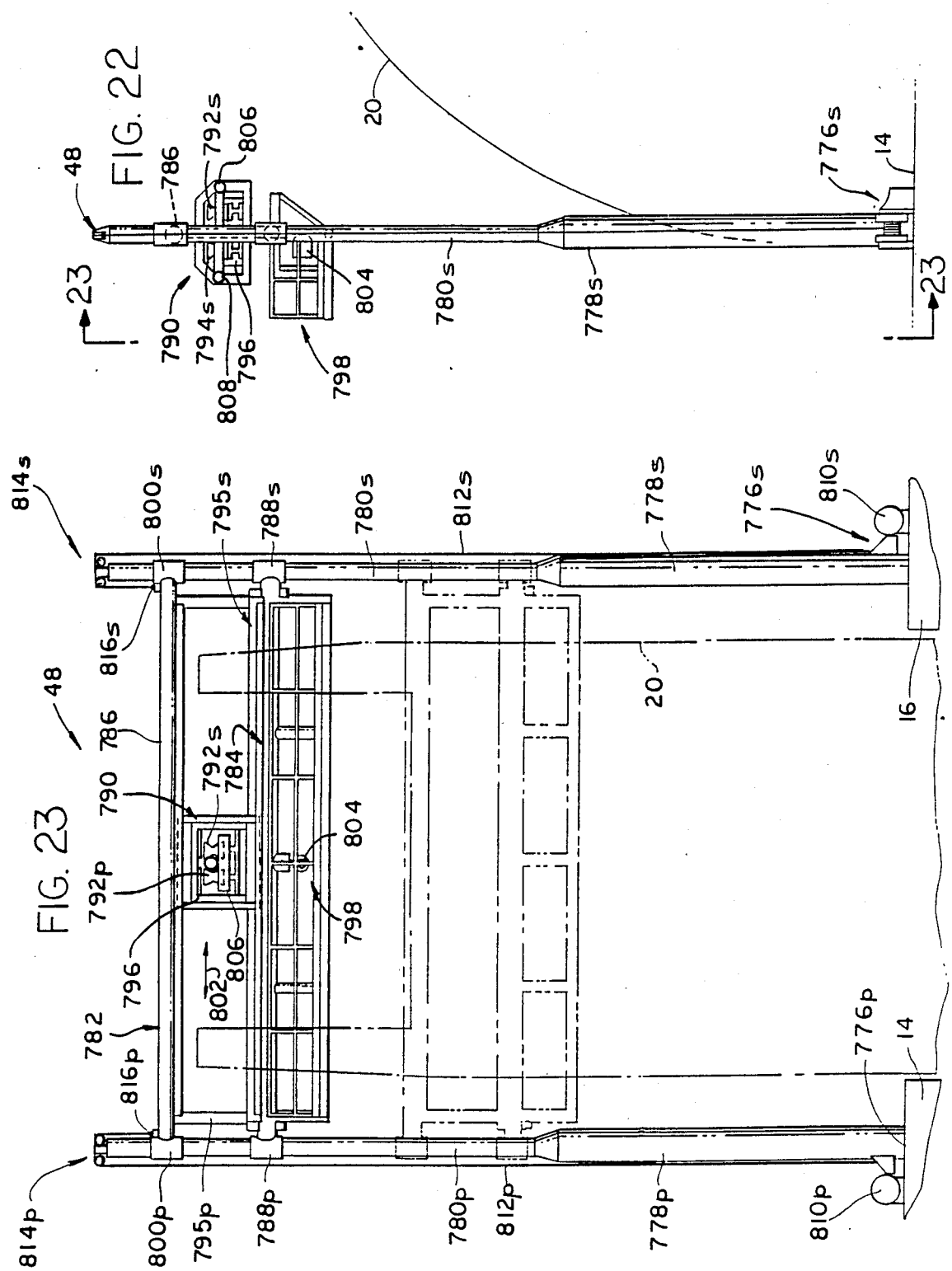

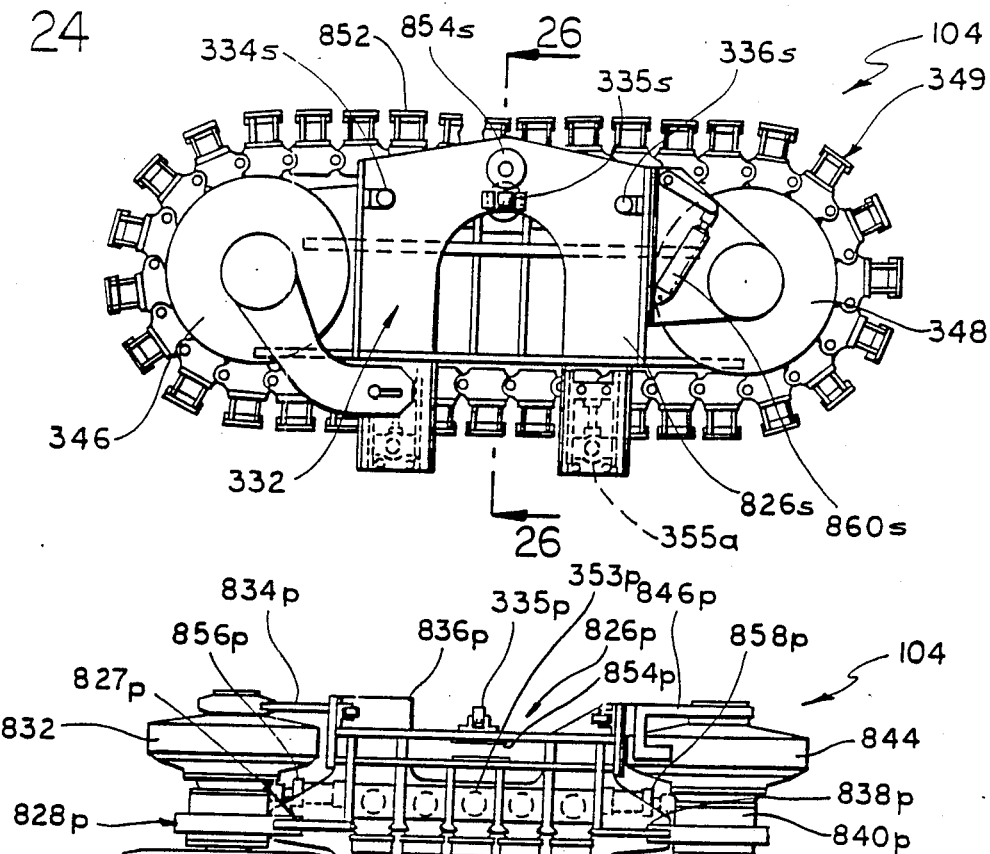
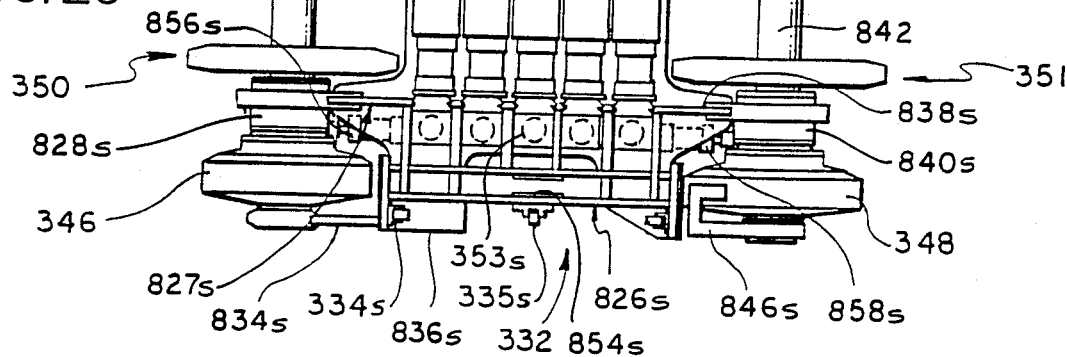
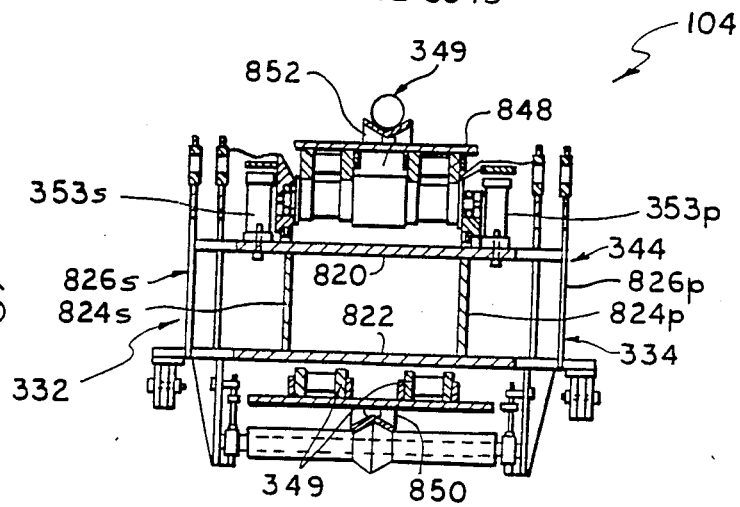

PIPELINE LAYING SYSTEM AND VESSEL WITH PIPELINE STRAIGHTENING AND TENSIONING DEVICE

This application is a division of Ser. No. 07/048,454, filed May 11, 1987, now U.S. Pat. No. 4,820,082, which is a continuation of Ser. No. 06/757,790, filed July 22, 1985, now abandoned, which is a continuation-in-part of Ser. No. 06/646,112, filed Aug. 31, 1984, now U.S. Pat. No. 4,687,376, for Multi-Reel Operational Lines laying Vessel, which is hereby incorporated by reference as though fully set forth herein.

BACKGROUND OF THE INVENTION

1. Field of the Invention

This invention relates to a reel pipelaying system and vessel on which at least one reel is disposed for laying a pipeline in waters having depths limited only by the strength of the pipe. More particularly, the invention pertains to a new type of pipeline layout system and vessel in which at least one reel is employed for storing and unspooling a rigid walled pipeline. The laying system provides for the layout of a pipeline from any one of a plurality of reels and for the adjustment of water entry angles over a wide angular range.

The vessel of this invention is designed to accommodate a permanently mounted pipe spooling main reel which is of substantial size and is capable of spooling pipe up to 16 inches in diameter. The laying system is stern mounted for handling the layout during unspooling from this permanently mounted main reel or from auxiliary storage reels.

2. History of the Prior Art

In laying offshore subsea pipelines for such uses as the gathering of oil and/or gas from offshore wells, as, for example, in the Gulf of Mexico, it has been conventional to use one of two main methods to lay the pipe. In the first, called the "stovepiping" method, a pipeline is fabricated on the deck of a lay barge by welding together individual lengths of pipe as the pipe is laid out from the barge Each length of pipe is about 40' or 80' long. Thus, the pay-out operation must be interrupted periodically to permit new lengths of pipe to be welded to the string. The stovepiping method requires that skilled welders and their relatively bulky equipment accompany the pipelaying barge crew during the entire layout operation; all welding must be carried out on site and often under adverse weather conditions. Further, the stovepiping method is relatively slow, with experienced crews being able to lay only one to two miles of pipe a day. This makes the entire operation subject to weather conditions which can cause substantial delays and make working conditions quite harsh.

The other principal conventional method is the reel pipelaying technique. In this method, a pipeline is wound on the hub of a reel mounted on the deck of a lay barge. Pipe is generally spooled onto the reel at a shore base. At such a shore base, short lengths of pipe can be welded under protected and controlled conditions to form a continuous pipeline which is spooled onto the reel. The lay barge is then towed to an offshore pipelaying location and the pipeline is spooled off the reel between completion points. This method has a number of advantages over the stovepiping method, among them, speed (one to two miles per hour advantage); lower operating costs, e.g., smaller welding crews and less welding equipment must be carried on the lay barge; and less weather dependency.

The broad concept of reel pipelaying was also disclosed in British Patent No. 601,103 (Ellis) issued Apr. 28, 1948, wherein it was suggested that lengths of pipe be joined together at the manufacturing plant and coiled onto a drum and mounted on a barge or ship; the loaded barge would then be moved to the desired marine location and the pipe unwound from the drum by fixing one end of the pipe and towing the barge away from the fixed location.

After a hiatus of about thirteen years, research into the reel pipelaying technique was renewed and was carried on by Gurtler, Herbert & Co., Inc. of New Orleans, La. By 1961 that company had sufficiently advanced the reel pipelaying technique to make it a commercially acceptable and viable method of laying pipe in the offshore petroleum industry, able to compete with the traditional stovepiping technique. The first known commercial pipelaying reel barge, called the U-303, was built by Aquatic Contractors and Engineers, Inc., a subsidiary of Gurtler, Herbert, in 1961. The U-303 utilized a large vertical axis reel, permanently mounted on a barge and having horizontally oriented flanges (generally referred to in the trade as a "horizontal reel"). A combined straightener-level winder was employed for spooling pipe onto the reel and for straightening pipe as it was unspooled. The U-303 first laid pipe commercially in September 1961 in the Gulf of Mexico off the coast of Louisiana and was used successfully during the 1960's to lay several million linear feet of pipe of up to 6" diameter. The U-303 reel pipelaying barge is described in U.S. Pat. No. 3,237,438 (Tesson) and U.S. Pat. No. 3,372,461 (Tesson) both assigned to the assignee of the invention hereof.

The successor to the U-303 currently in use in the Gulf of Mexico and known in the trade as the "Chickasaw" also utilizes a large horizontal reel, permanently mounted to the barge such that it is not readily moveable from one carrier vessel to another. Various aspects of "Chickasaw" are designed in the following U.S. Patents, all assigned to the assignee of the invention hereof:

Sugasti, et al.—U.S. Pat. No. 3,630,461
Gibson—U.S. Pat. No. 3,651,778
Mott, et al.—U.S. Pat. No. 3,680,342
Key, et al.—U.S. Pat. No. 3,712,100.

The Gibson patent shows an apparatus for diverting a single pipeline from a horizontal unspooling direction to a vertical direction for layout in a body of water. The patent describes very simple unspooling tools which do not provide for certain important pipeline handling functions.

U.S. Pat. No. 3,685,306 to Mott also describes an apparatus which diverts a single pipeline from a horizontal position to a fixed vertical direction. The pipeline can be successively unreeled from adjacent ganged reels but the water entry angle cannot be adjusted to permit layout in variable water depths.

Commercial reel pipelaying techniques require the use of certain pipe handling equipment in addition to the reel. Among such pipe handling equipment usually employed in commercial reel pipelaying systems is a straightener mechanism. This may take the form of a series of rollers or tracks, or other arrangement which imparts sufficient reverse bending force to the pipe to remove residual curvature so that after unspooling, the pipe will lay substantially straight on the sea bottom.

Other pipe handling equipment used in commercial reel pipelaying systems must be provided for facilitating pipeline adjustments, particularly for inspecting pipeline coatings and repairing the same. Valves must be inserted into the pipeline at various lengths and for this operation pipe clamping and holding equipment is provided. Various sacrificial anodes, survey markers, transponders and floats must also be attached to the pipeline in a pipe handling station for many projects. Commercial reel pipelaying systems also provide equipment for making connections with and to existing pipeline structures. For making such connections pipe clamping means are required.

U.S. Pat. No. Re. 30,846 (Lang et al) describes an apparatus for laying pipeline from a vertical reel in which the pipe conditioning apparatus is pivotable to adjust the lift-off angle of the pipe relative to the horizontal plane (e.g., the deck of a ship) as a function of the water depth in which the pipe is being laid. This has distinct commercial advantages, especially where the reel pipelaying system is incorporated into a self-propelled ship, such as that of the present invention, capable of traveling to different job sites, having different pipe size and/or laying depth requirements.

An early concept for a reel pipelaying ship is described in Goren, et al. "The Reel Pipelay Ship—A New Concept" Offshore Technology Conference Proceedings, May 1975 (Paper No.—OTC 2400) This paper (hereafter the Goren, et al 1975 OTC Paper) describes advantages and operating features of a proposed reel pipelaying ship. However, the cost of construction of a ship as described in that paper was estimated to be on the order of $100,000,000.

APACHE REEL LAYING VESSEL

The research and development work for the ship described in the Goren, et al paper, (done at great expense by and on behalf of the assignee of this application) was subsequently materially revised in numerous major respects, and substantial changes and improvements were made to achieve the design of a substantially different reel pipelaying ship which is described in the following U.S. Patents, all assigned to the assignee of the invention hereof:

Springett, et al—U.S. Pat. No. 4,230,421
Uyeda, et al—U.S. Pat. No. 4,269,540
Yenzer, et al—U.S. Pat. No. 4,297,054
Springett, et al—U.S. Pat. No. 4,340,322
Uyeda, et al—U.S. Pat. No. 4,345,855

The disclosures of these five single reel patents are hereby incorporated as though fully set forth herein.

The vessel described in these patents was constructed and is currently in use in various offshore oil fields and is known in the offshore oil industry as the "Apache." This vessel is a self-propelled dynamically positioned single reel pipelaying ship which has a specially constructed hull comprising a reel support structure for rotatably mounting a vertical reel for unspooling a rigid walled pipeline. A single pipeline is handled by this ship. Other pipe handling equipment included are a pipe bending radius controller; pipe straightening equipment; clamping assembly; a stern pipe guide assembly and a level wind assembly. A tensioning assembly is also arranged on a support ramp assembly. The pipe exit angle or the water entry angle can be varied from 18° to about 60° since this is the range of angular movement of the support ramp assembly. The upper part of this range of the pipe water entry angles is sufficient to accommodate laying a single pipeline in approximately 3,000 ft. water depth. In order to lay pipe at greater depths it is necessary to increase the pipe water entry angle.

The Apache vessel does not have adequate unused deck space to permit the convenient placement of auxiliary reels. An early suggestion which was made during the vessel's construction phase and mentioned in the above patents was that portable reels could be placed on the Apache deck to permit stern bundling of smaller lines with the pipeline from the main reel. These smaller lines were not to be passed through the pipe handling equipment with the main reel pipeline according to the suggestion. This stern bundling suggestion was made in the OTC Paper No. 3069, May 8–11, 1978.

SUMMARY OF THE INVENTION

There are increasing requirements in the offshore petroleum industry for laying pipelines in deep water at depths greater than 3,000 feet and in remote areas far from supply bases. To be commercially viable a pipelaying vessel must also be capable of laying pipelines in shallow water of less than 200 feet up to over 3,000 feet in depth. The pipelaying system and support vessel of this invention represents a new and different concept to meeting these needs.

The vessel utilized with the pipelaying system of this invention can be a self-propelled dynamically positioned ship or it can be a barge which requires a tug for motive power. The vessel deck is utilized to mount auxiliary reels for the layout of additional operational lines when needed.

A principal feature of the present pipelaying system is that a pipeline laying device is mounted adjacent to the stern of the vessel. The pipeline laying device includes a pipeline support means for providing simultaneous moving contact for the pipeline and also includes a pipe take-off structure which moves arcuately about the perimeter or periphery of the supporting means. The pipe take-off structure supports a pipe handling means which facilitates the making of certain commercial required pipeline adjustments and connections. A pipeline is unspooled from one of the storage reels mounted on the vessel and moved into the laying device where it comes into frictional contact with the pipeline support means which is adapted for providing moving contact for the pipeline. The preferred laying device of the present invention changes the direction of movement of the pipeline from horizontal to a range of angles up to about 90° (vertical) and can be thus used for laying pipelines in shallow waters of under 200 feet down to much greater depths of 7,500 feet and beyond.

The preferred pipeline laying device also includes straightening and tensioning devices which are adapted to straighten and provide tension for the pipeline. The straightening means is adapted for imparting a reverse bending force to the rigid walled pipeline.

The preferred pipeline laying system has a pipeline laying device or take-off assembly mounted adjacent to the stern of the vessel The take-off assembly includes a rotatably mounted drum and a pipe take-off structure which can preferably contain straightening and tensioning devices as well as additional pipe clamping means. The pipe take-off drum in the laying device is not powered by a separate motive means but rather is rotated by the frictional contact between the pipeline with the periphery of the drum which is adapted to function as a pipeline support means.

The take-off structure is rotatably journaled for arcuate movement at a predetermined distance spaced from the perimeter or periphery of the take-off drum. This pipe take-off structure permits water entry angles for the pipeline of from about 20° to 90° so as to permit lay out of lines at depths of about 200 feet to much greater depths. The upper part of this range from about 60° to 90° is used for deep water laying in 3,000 feet and greater depths.

Level wind carriages are also preferably provided for mounting the pipeline laying device so that it can move transversely across the vessel deck as the pipeline is being unspooled from the storage reel.

The pipeline take-off structure includes pipe handling means which facilitate making pipeline adjustments and connections which are required for commercial pipelaying. Such pipe handling means includes the provision of a work platform from which the pipeline coating can be inspected and repaired, when necessary, and from which valves can be inserted into the pipeline after it is cut through and from which various sacrificial anodes, survey markers, transponders and floats can be attached to the pipeline as it is unspooled and laid out. Another pipe handling means included in the pipeline take-off structure is a pipe clamping means and a pipeline adjustment means for use in making connections to existing recovered pipelines. Abandonment and recovery (A/R) equipment is also placed in the take-off structure.

The laying device can be arranged to cooperate with a straightening device contained within the pipe take-off structure so as to contribute one of three force imposition zones directed to the rigid walled pipeline in order to reverse bend the pipeline in the opposite direction to the curvature imparted by the storage reel.

In this embodiment it is possible to use the hydraulic braking systems on the storage reel hydraulic motors to provide tensioning of the pipeline, thus permitting pipe layout in the absence of separate straightening and/or tensioning devices. The laying device and the pipeline storage reel together with the associated straightening and tensioning devices and level wind carriages form a pipeline layout system which has a variety of novel features.

The preferred embodiment of the laying device of the present invention has the advantage of being light weight, about 270 long tons, compared to about 600 tons for the pipe handling equipment on the aft deck of the Apache pipelaying vessel described above.

Other embodiments of the pipeline laying system of the present invention employ continuous track straightening and tensioning assemblies mounted on carriages which are reciprocally and pivotally mounted within the pipe take-off structure.

In summary, the preferred embodiment includes a laying device comprising a rotatably mounted drum and an attached pipe take-off structure which is operative for laying out a rigid walled pipeline over a very wide range of water depths of from less than 200 feet to much greater depths even beyond 7,500 feet.

STRAIGHTENER AND TENSIONER DEVICES

The straightening and tensioning devices can be of two types. The first type is a straightening device which is operated independently from the tensioning device. The second type is a combined straightening/tensioning device comprising two continuous track assemblies which are employed on opposite sides of the pipeline in order to provide both the straightening and the tensioning functions. The second type involves the use of a new straightening/tensioning device which is capable of imparting controlled curvature to the rigid walled pipeline and is also capable of providing longitudinal tension force. The advantage of this second type of straightening device is that only two such assemblies are required for both of the straightening and tensioning functions whereas in the first type four or five separate track assemblies are usually required for the layout of a rigid walled pipeline.

The pipeline laying device is mounted on the vessel via a carriage which is capable of level winding transversely across the vessel deck to provide for controlled spooling and unspooling of the pipeline onto and off one of a plurality of storage reels. The storage reels are fitted with hydraulic motors for imparting motive power to the reel flanges or rims in order to provide for spooling up of the lines. The hydraulic motors are also fitted with hydraulic braking systems for controlling tension of the lines during unspooling and to control the rate of line layout.

The present invention permits a rigid walled pipeline to be laid out on the bottom of bodies of water in a controlled and straightened manner. The particular pipe handling means selected for a given project depends upon the depth of water and the project budget available. Other technical/economic considerations such as the permissible capital investment, speed of pipeline layout, customer flexibility of design characteristics, and the sea state spectrum also enter into the selection process. The specific straightening and tensioning devices used are determined by various pipe handling means technical characteristics and economic considerations.

Another feature of the present invention is that a dynamically positioned vessel can be alternately converted between a single pipeline laying capability such as described in the above mentioned Springett, et al, Uyeda, et al and Yenzer, et al patents which is embodied in the Apache pipelaying ship and the vessel described in the present application. In order to accomplish this alternate use, the main pipeline reel is maintained in fixed position and the remainder of the pipe handling equipment shown on the aft deck of the vessel in those U.S. patents is replaced with the layout system herein described which includes one or two auxiliary reels and the pipeline laying device described herein. Thus, a convertible capability for changing the pipelaying vessel between an intermediate water depth pipelaying vessel like Apache and a wider depth range vessel is also included within the present invention.

It is, therefore, an object of the present invention to provide a pipelaying system which can lay out from a vessel deck a straight pipeline onto the sea bottom of waters over a depth range of from about 200 feet to over 3,000 feet.

Another object is to provide a pipeline layout system for use on a vessel in which one or more storage reels are provided for sequentially spooling and unspooling of a plurality of rigid walled pipelines.

Another object of the present invention is to provide a layout system in which three storage reels are mounted on a vessel deck for sequentially spooling and unspooling pipelines of different diameters for layout onto the sea bottom after passing through a common laying device which provides for straightening of the lines.

Yet another object of the present invention is to provide a layout system which is light weight and can be transferred onto pipelaying vessels by exchange of pipe handling equipment existing on such vessels with the layout system herein described.

Another object is to provide an improved straightener/tensioner device which permits the establishment of selected curvatures for controlling the straightening process and applying the desired tension for maintaining pipeline profile over a wide range of layout water depths.

Another object is to provide an improved spooling and unspooling method for use with the pipeline layout system herein described.

For convenience, the following terms may be employed in the description of this invention:

1. A "turn" is that length of pipe wound through one complete revolution of the reel.

2. A "wrap" comprises a plurality of turns making up a layer of pipe wound on the reel across the full or substantially full width of the reel.

3. "Level winding" refers to the transverse movement of the laying device or a storage reel across the deck of the vessel. The level "winding means" refers to apparatus for carrying out such movement.

4. "Track straightening or tensioning assemblies" refers to flexible track systems having a plurality of pipe support pads mounted thereon and which are designed for either of the two functions of straightening or tensioning.

5. The term "track straightening/tensioning assemblies" refers to tensioning assemblies which are designed to provide both straightening and tensioning functions in a single pair of such assemblies when positioned on opposite sides of the pipeline.

6. "Carriage" refers to the support frame structure which is used to mount the laying device on the vessel and to provide for level winding thereof.

7. "Main reel" refers to a large diameter storage reel which is permanently mounted within the vessel for spooling and unspooling rigid walled pipeline.

8. "Operational lines" include rigid walled metal pipelines which can be preferably coated, plastic walled lines, electrical cables, tension support cables, etc.

9. The notations "s" for starboard, "p" for port, "f" for fore and "a" for aft have been used for convenience in numerals designations.

Other features and advantages of the multi-reel vessel of this invention will become apparent from the following drawings and detailed description.

BRIEF DESCRIPTION OF THE DRAWINGS

FIG. 6 is a side elevation of the pipe take-off drum;

FIG. 7 is a cross-sectional view through a portion of the pipe take-off drum of FIG. 6 taken on line 7—7;

FIG. 9 is a cross sectional view taken through the straightening device on line 9—9 of FIG. 8;

FIG. 10 is a cross-sectional view taken through the pipe take-off structure showing the tensioning device of the present invention taken on line 10—10 of FIG. 8;

FIG. 11 is a cross-sectional view of the pipe take-off structure in FIG. 8 showing the pipe alignment clamp taken on line 11—11 of FIG. 8;

FIG. 12 is a side elevation view of the pipe take-off drum support frame structure;

FIG. 13 is a front view of the support frame structure of FIG. 12;

FIG. 14 is a top plan view of the support frame structure of FIG. 12;

FIG. 17 is a side elevation view of the straightener device of the FIG. 8 embodiment;

FIG. 18 is a top plan view of the straightener device of FIG. 17 with the sprocket chain track removed;

FIG. 19 is a cross-sectional view taken on line 19—19 of FIG. 17 showing the adjustable idler rollers and the pipeline support pads mounted on the sprocket track;

FIG. 22 is a longitudinal side elevation view of the level wind tower associated with the main reel;

FIG. 23 is a transverse frontward elevation view of the level wind tower assembly associated with the main reel;

FIG. 24 is a side elevation detailed view of one of the track tensioner assemblies of FIGS. 3 and 8;

FIG. 25 is a top plan view of the tensioner assembly of FIG. 24 with the track removed;

FIG. 26 is a cross-sectional view of the tensioner device of FIG. 24 taken on line 26—26;

DESCRIPTION OF THE PREFERRED EMBODIMENTS

Figure 2:
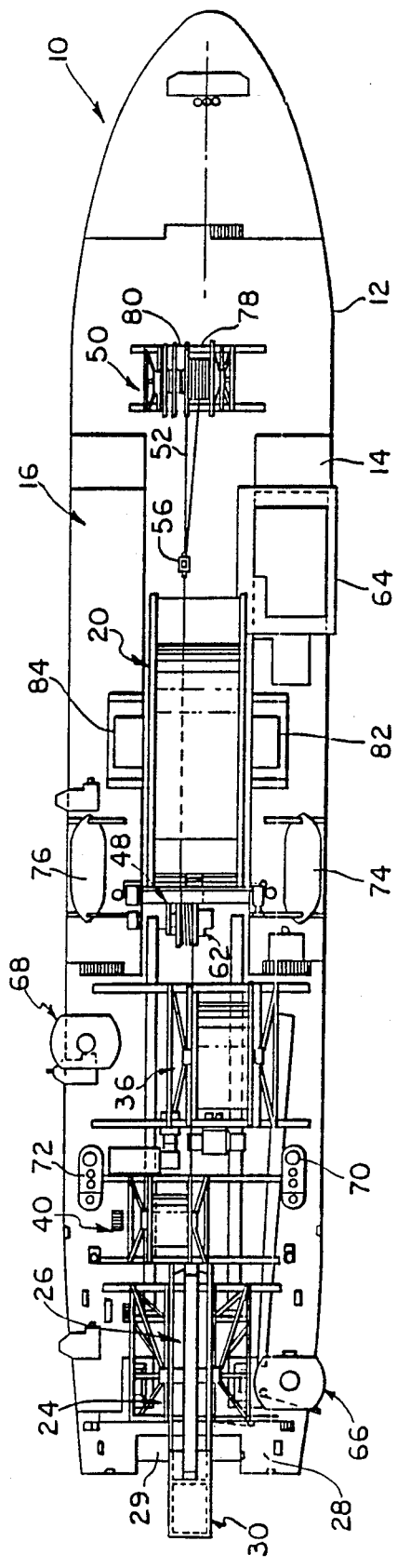
FIG. 2 is a top plan view of the vessel of FIG. 1.

The pipelaying vessel 10 of FIGS. 1-5 has a hull 12 which is constructed with starboard and port main reel support structures 14 and 16 which are elevated above the fore deck 17 and the aft deck 18. These reel support structures rotatably support a main reel 20 which is positioned with its axis transverse to the vessel longitudinal axis and which is adapted to provide storage for a series of wraps of rigid walled pipeline which can be wound in single or multiple line fashion. A detailed disclosure of the vessel hull 12 and main reel 20 is set forth in U.S. Pat. No. 4,269,540.

Figure 1:
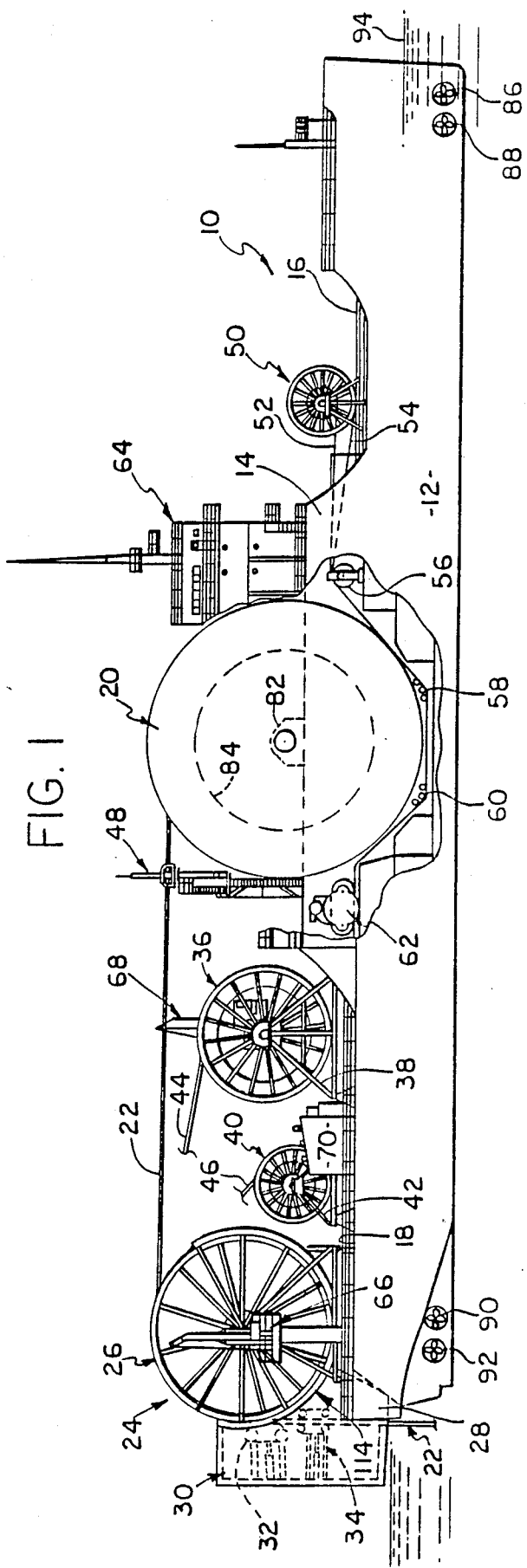
FIG. 1 is a starboard side elevation general arrangement view of a preferred embodiment of the pipelaying vessel.

A single pipeline 22 is shown being unspooled from the vertically disposed main reel 20 onto the pipeline laying device or pipe take-off assembly 24 which includes as a main element a pipe take-off drum 26 positioned adjacent the stern 28 of vessel 10. The assembly 24 also includes a pipe take-off structure 30 in which a straightening device 32 is supported in forceable contact with pipeline 22. A tensioning device 34 is also included within the pipe take-off structure 30 for the handling of the pipeline 22. The structure 30 rests in a stern notch 29 when in its vertical 90° position as shown in FIGS. 1 and 2.

A first auxiliary reel 36 is mounted on a reel support frame 38 on the aft deck 18. Also a second auxiliary reel 40 is mounted on a reel support frame 42 which is also supported on aft deck 18. Pipelines 44 and 46 can be unreeled from auxiliary reels 36 and 40 alternately with the unreeling of pipeline 22 from main reel 20. Each of these pipelines are taken, in turn into the pipeline laying assembly or device 24 at the top of the take-off drum 26 and are maintained in continuous contact with the periphery thereof as the direction of movement of each of these pipelines is changed from horizontal to vertical at the stern end of the pipe take-off drum 26.

The sequential contact between the operational lines 22, 44 and 46 with the periphery of the pipe take-off drum 26 results in the changing of the direction of movement from horizontal to any angular pipe take-off position at which the take-off structure is set. The pipelines are then passed through the straightening means 32 and the tensioning device 34 so that each of these lines passes downwardly over the stern 28 which can be at nearly a 90° angle as shown in FIG. 1 for deep water layout.

A level wind assembly 48 is provided for aiding the spooling of pipeline onto main reel 20. The level wind feature is not used during unspooling since the pipeline is merely passed through this device so as to restrain the lateral movements. An abandonment and recovery (A/R) cable storage reel 50 is mounted to fore deck 16 for the storage of two cables 52 and 54 which are strung under main reel 20 by a fixed cable double groove sheave 56 and a series of cable rollers 58 and 60 through a twin drum traction winch 62. The A/R functions of the cables 52 and 54 combined with operation of the traction winch 62 are described below. The A/R cable storage reel 50 has two drum portions 78 and 80 for storing the two cables 52 and 54 separately.

A control tower 64 is mounted on the starboard reel support structure 14.

Pedestal cranes 66 and 68 are provided on starboard and port sides, respectively.

As shown in FIG. 2, starboard and port exhaust stacks 70 and 72 are provided for the diesel engine(s) used to power vessel 10. As required, lifeboats 74 and 76 are provided on port and starboard decks at midship.

Rotatable mounting bearings 82 and 84 are shown on either side of main reel 20 in FIG. 2. The main reel 20 has a hub 85 on which the successive turns of pipeline are wound.

The vessel 10 has fore and aft lateral thrusters 86, 88, 90 and 92 positioned below the waterline 94 to provide for the dynamic positioning of vessel 10 during unspooling of the operational lines. Thus vessel 10 is capable of dynamically positioning itself.

PIPELINE LAYING DEVICE

Figure 3:
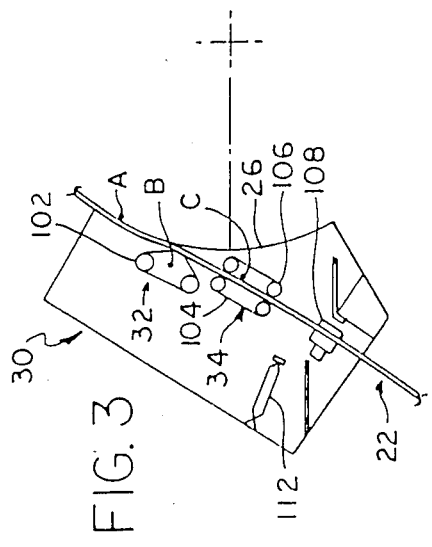
FIG. 3 is a schematic side elevation cross-section of a first embodiment of the pipe take-off structure of the present invention.

FIG. 3 shows, in general, the operation of the straightener device 32 which comprises a first track assembly 102 for contacting the pipeline 22. The straightener device 32 has idler rollers described below which can be adjusted to provide for various curvatures in the pipeline 22. The tensioning device 34 is formed by a second track assembly 104 and a third track assembly 106 which act on opposite sides of the pipeline 22, respectively, in order to provide tension for supporting the pipeline weight which is suspended from the pipe take-off assembly 24.

In order to straighten rigid walled pipeline, force must be exerted against three zones of the pipeline. The periphery of the pipe take-off drum 26 provides a first force zone A, the straightening device 32 provides a second force zone B within which the curvature must change, while the fore track assembly 106 of the tensioning device 34 provides a third force zone C. The straightened pipeline 22 is then passed downwardly through the pipe take-off structure 30 including the pipe clamp 108 and then into the body of water 110. A pipe aligner 112 is also positioned within the pipe take-off structure 30 in order to change the position of the rigid wall pipe 22 over relatively small distances. The pipe clamp 108 is placed before the pipe exits the pipe take-off structure 30 and is used for pipeline abandonment and recovery operations.

The entire pipe take-off structure 30 is mounted on a support frame structure 114 which is in turn rotatably mounted on axle 116 of the pipe take-off drum 26. A hydraulic motor 118 is mounted on a support carriage 120 and is arranged to provide power to a peripheral welded chain track on the arcuately curved outside surface of frame structure 114. In this manner the frame structure 114 and the attached pipe take-off structure 30 are rotated relative to the support carriage 120 in order to obtain various pipe water entry angles.

The angle shown in FIGS. 1 and 2 is approximately 90° whereas the angle shown in FIG. 3 is approximately 60°. As mentioned above the rotational motion of the pipe take-off structure 30 can be varied between about 20° to about 90°. This permits the pipe take-off structure or the pipelaying device of the present invention to lay out operational line array in shallow waters of less than 200 feet in depth for which low angles are used or in deeper waters beyond 3,000 feet for which larger angles of from 60° to 90° are used. The provision of this wide lay out water depth range for the pipeline 22 is an important feature of the present invention.

The pipe take-off assembly 24 includes the stern mounted drum 26, the pipe take-off structure 30, the support frame structure 114 and the support carriage 120 with its underlying level wind track assembly. The assembly 24 functions as the pipeline laying device. The described take-off assembly 24 includes the straightening, tensioning and other pipe handling equipment and functions as the pipeline laying or lay out system.

OPERATIONAL LINES

The operational lines 22, 44 and 46 which are laid out individually from assembly 24 can be a variety of types which provide for a wide range of functions. All of the lines can be rigid walled steel or metal pipeline such as pipeline 22 which is stored on the main reel 20. The other two operational lines 44 and 46 can be also plastic lines, electrical cables, tension support cables, etc. Some or all of these lines can be thermally insulated. Non-restricting operating examples are that the line 22 can be a 6 inch o.d. rigid walled pipeline; the line 44 can be of 4 inch o.d. rigid walled pipeline; and the line 46 can be either a single or dual set of electrical lines. Each of these lines can be passed over the pipe take-off drum 26 and then passed through the straightening device 32 and tensioning device 34, even though the plastic, electrical, and support lines may not require straightening and hence are passed through without the straightening device being in operative contact in order to use the layout drum 26.

Another aspect of the operational lines is that these can be lines which have an outer sheath formed about a number or smaller lines which are bundled within the sheath. The sheath for such bundles of lines can be either continuous walled or in the form of a bundle wrapping. The lines in the bundles can be combined with either single lines or other bundled lines to form operational lines arrays stored on the multi-reel vessel 10. Examples are that a 3 inch or 4 inch o.d. sheath line can have approximately fifteen one-half inch lines within the same bundling sheath. Electrical control lines can also be bundled within a sheath.

The main reel 20 can accommodate rigid walled pipe of from 2 inches to 16 inches o.d. The first auxiliary reel 36 can accommodate from about 2 inch to approximately 9 inch o.d. rigid walled pipeline or other operational lines such as electrical cables or tension support cables.

The second auxiliary reel 40 can be utilized for about 2 inch to about 5 inch o.d. rigid walled pipelines or tension support cables or electrical cables. The diameter range of the rigid walled pipelines which can be stored on and unreeled from the auxiliary reels is a function of the hub diameters of those reels as specified below.

It is often desirable to utilize the main reel 20 and the first auxiliary reel 36 for rigid walled pipelines and to utilize the second auxiliary reel 40 for the storage and subsequent layout of electrical lines and tension support cables.

Figure 4:
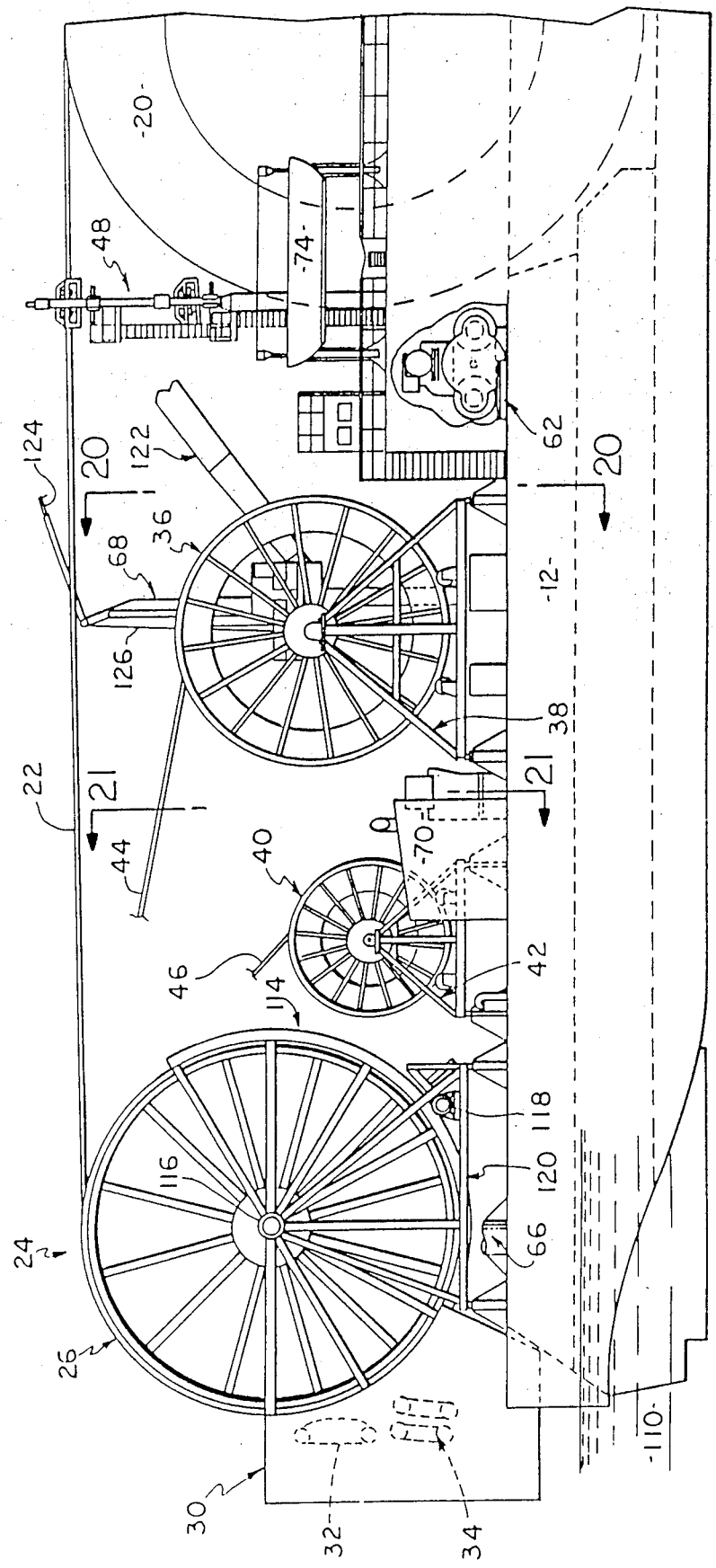
FIG. 4 is an enlarged starboard side elevation of the operational line reels and the pipe take-off drum of the present invention.

Also show in FIG. 4 is the boom 122 of the pedestal crane 68. The elevation cable 124 is also shown attached to the top of the crane arm 126.

PIPE TAKE-OFF DRUM

FIGS. 6 and 7 show the outer rim 130 and a central hub 132 of the pipe take-off drum 26. The hub is connected to the peripheral rim 130 by a series of radial spokes 134-156. The connection at the center of the hub is formed by a central cylinder 158 which is mounted on a rotatable axle 116. A series of starboard hub gussets 162-184 are integrally connected to the cylinder 158 and to a starboard flange ring 186. A similar series of port side construction gussets are connected to cylinder 158 and to a port side flange ring 188 as illustrated by port gussets 190 and 192 in FIG. 7.

The spokes are connected to the rim structure 130 by a series of starboard peripheral gussets 194-216 and by a similar series of peripheral gussets on the port side as shown by gusset 218 for spoke 136 in FIG. 7.

Pipeline supporting means 220 is supported about the periphery of the take-off drum 26 and is constructed with an annular groove 224 to provide for continuous frictional contact with the pipeline during contact thereof during the layout operation. The supporting means 220 is mounted on a rim 234 which is integrally connected to the ends of the spokes as shown for spoke 136 in FIG. 7. An internal re-enforcement rim 236 is spaced below the outer rim 234 and is connected thereto by the starboard and port peripheral gussets 196 and 218 respectively as shown in FIG. 7.

Starboard and port side rims 238 and 240 are also connected to the outer rim 234 and extend upwardly on either side of the pipeline supporting means 220. The groove 224 forms an indented configuration which extends partially around the outer diameter of the pipeline which is placed in this groove during the layout operation. The size of the groove can be varied depending on the particular pipeline requirements of a given job. For this purpose, the support means 220 is constructed in removable arcuate segments in order to accommodate varying diameters or operational lines.

Also shown in FIG. 7 are the internal gussets 242 and 244 which are representative of the series of such gussets provided for interconnecting the inner and outer rims 234 and 236 with the terminal portions of the drum spokes.

The diameter of the pipe take-off drum 26 is chosen so as to lay out the pipeline with residual ovality at lower than the maximum limits specified by the international certification organizations. These ovality limits are not necessary for all offshore construction projects so that specific pipelines can be laid in some territorial areas without observing such limits.

It has been found satisfactory to size the drum 26 radius with respect to the pipeline diameter. The wall thickness of the pipeline is also of interest with respect to the pipe diameter. A satisfactory set of relationships for sizing the drum 26 radius is:

$$R \geqq 18D \tag{1}$$

where R is the drum 26 radius measured to the pipeline center in given units; and D is the pipeline outer diameter measured in the same units. A correlated relationship of pipeline diameter to pipeline wall thickness is expressed by:

$$D/T < 30 \tag{2}$$

where D is pipeline outer diameter in given units and T is pipeline wall thickness in the same units.

A preferred relationship is:

$$D/T < 20 \tag{3}$$

where D and T are as above defined.

STRAIGHTENING AND TENSIONING ASSEMBLIES IN GENERAL

The pipe take-off assembly 24 generally described in FIG. 3 is shown with greater detail in FIGS. 8-11. The pipe take-off structure 30 and support frame structure 114 are integrally constructed with a top port side radial frame member 250$p$ which extends from its connection with a bearing sleeve mounted on the pipe take-off drum axle 116 beyond the periphery of the drum 26 and an aft beam 252$p$ which is perpendicularly connected to that top side frame member at its stern end. An intermediate frame member 254$p$ is connected to the end of a radial frame member 256p through the arcuate frame member 260p. The frame member 256p has the other end thereof integrally connected to the bearing sleeve 257p (FIG. 15) on the drum axle 116. A third radial beam 258p is also connected to the sleeve 257p about drum axle 116 and extends beyond the periphery of drum 26 in order to form the fore frame section of the pipe take-off structure 30.

The arcuate cradle members 260p and 260s are connected between the starboard and port radial frame members 250, 256 and 258 and are designed to be rotated with these members about the periphery of drum 26. The frame members 250p-260p form the port side of the structural support for pipe take-off structure 30. A corresponding starboard set of structural members are connected to the above described port side set by transverse frame members 262, 263, 264, 266, 267, 268, 269, 270, 272, 273, 274, 276 and 278 (numbered in clockwise positioning from lower right) which are interconnected at the framing juncture points between the starboard and port frame members.

Starboard and port sets of parallel structural guides are provided for adjustably mounting straightening device 32 and the two halves of tensioning device 34 within the pipe take-off structure 30. Port structural guide set 280p has three parallel internal guide frames 282p, 283p and 284p which are connected by the aft end thereof to the transverse frame members 272, 273 and 274, respectively. The fore ends of the internal guide frames 282p, 283p and 284p are connected to matched exterior side frame members illustrated by frame 285p via spacers illustrated by 286p in FIG. 9. This side frame 285p is, in turn, connected to arcuate cradle member 260p.

A similar port set of parallel internal guide frames 287p is provided for the tensioning device 34 by guide members 288p, 289p and 290p which are connected at the aft end thereof to transverse members 267, 268 and 269 and to port and starboard side spacer members as shown by members 292p and 292s (FIG. 10). A matching set of internal guide frames 288s, 289s and 290s are positioned on the starboard side of the pipe take-off structure 30 for guiding the aft positioned second track assembly 104 which forms part of the tensioning device 34. These internal guides are reinforced by matched exterior side frame members illustrated by frames 294p and 294s (FIG. 10) in similar fashion to that described above for the straightening device 32.

The third track assembly 106 which forms part of the tensioning device 34 is similarly set in internal guide frame 296p which is formed by parallel structural members 298p, 299p and 300p which are affixed to the side frame members as shown by frame 294s (FIG. 10) and then to arcuate member 260p. Side spacer members 302p,s and 304p,s, respectively, are provided for positioning the middle internal guides 299s,p. A starboard set of structural guide members 298s, 299s and 300s are also provided for mounting the third track assembly 106. The lower guide frames 300p and 300s are spaced from matched exterior frames by similar spacers.

The straightening device 32 is formed by the first track assembly 102 and the hydraulic positioning rams 306p and 306s which are positioned on the port and starboard sides of the main track carriage 308, respectively. Guide rollers 310p, 311p and 312p are rotatably mounted on the port side of carriage 308 in a position to contact the internal guide frames 282p, 283p and 284p, respectively. The operation of the rams 306p and 306s permit both sliding, $S_1$, and pivotal, $S_2$, adjustment of the first track assembly 102 with respect to the upper and lower positioned internal guide frames 282p, s and 284p, s. The lower hydraulic rams 306p and 306s are pivotally connected by fixed ears 314p and 314s to the aft structural transverse member 273. The hydraulic ram piston rods 316p and 316s are also pivotally connected to the port and starboard sides of the main carriage 308, respectively, via connections 317p and 317s (FIG. 9). Sprocket gear wheels sets 318 and 320 are rotatably mounted in bearings on the top and bottom ends of the main carriage 308 for supporting a corresponding series of track mechanisms 322. Adjustable sprocket idler gear sets 324 and 326 are mounted on the aft side of the main carriage 308 on hydraulic cylinder mounts 325 and 327, respectively, for providing additional support for the series of track mechanisms 322.

The track mechanism 322 is further described below with reference to FIGS. 9 and 17-19. The first track assembly 102 has an idler assembly carriage generally designated as 328 which provides a series of idler roller sets which force the flexible chain track 322 into contact with the pipeline 22. Further details of the operation of the first track assembly 102 and the idler roller assembly 328 are set forth below. Screw jack adjusters 329 are provided for manually changing the position of the rollers to establish selected curvatures. The mounting and operation of the straightener device 32 permits various curvatures to be formed by the flexible track 322.

The second track assembly 104 which, in part, comprises the tensioner device 34 is positioned by hydraulic rams 330p and 330s which are positioned on either side of the second track assembly main carriage base 332. Port side guide rollers 334p, 335p and 336p are rotatably mounted on the port side of the main carriage member 332 (shown in FIGS. 24 and 25) for engaging the parallel structural guide members 288p, 289p and 290p, respectively. This type of screw jack is sometimes referred as a jactuator. Starboard guide rollers 334s, 335s and 336s are provided for the starboard side of the main carriage 332 and for contacting the corresponding structural guides 288s, 289s and 290s.

A similar set of shorter rams 338p and 338s are provided for the third track assembly 106 which forms the second part of the tensioning device 34. The third track assembly is positioned by these rams within the port and starboard structural guide sets 298s, p, 299s, p and 300s, p. Guide rollers 340p, 341p and 342p are positioned on the port side of main carriage member 344 for providing rolling contact along the port guide frame sets 298p, 299p, and 300p.

Hydraulic motors 346 and 348 are provided for the starboard side of track assembly 104 in order to drive the flexible chain track 349 which is mounted on corresponding sets of driven sprocket gears 350 and 351, respectively, shown in FIG. 25. An idler roller assembly 352 is provided for the tracks 349 and corresponds in relative position to the idler assembly 328 for the first track assembly 102. FIG. 10 shows representative adjustment cylinders 353s, p which permit variation in applied force for the idler roller assembly 352. The opposing operational lines support pad pairs 354a and f are positioned on either side of the pipeline 22. Also configured backup rollers 355a and 355f are shown in phantom as used for assemblies 104 and 106.

Similar guides and idler assemblies are provided for the third track assembly 106. The detailed description of track assemblies 104 and 106 is set forth in connection with FIGS. 24–26, below.

An alternate track assembly for the third track assembly 106 is to mount the hydraulic rams 338p and 338s between the main carriages 332 and 344 of the two opposing track assemblies 104 and 106. It is necessary to provide for imposition of different forces on the operational line array by these two opposed track assemblies since track assembly 106 provides the third force zone of a three zone straightening system as described with respect to FIG. 3. The force exerted at the third zone for straightening is of course separate from the tensioning force which is exerted through any alternate hydraulic rams connected between the main carriages. In this alternative the hydraulic rams 330s and 330p would provide the straightening force exerted by assembly 106.

Other important features of the pipe take-off structure 30 are the pivotally connected floor panels 356 and 358 of the working platform which can be adjusted with respect to various angular operating positions of the cradle members 260s, p. This working platform enables various important pipe handling functions to be performed within the pipe take-off structure. Also a lower winch housing 360 and an abandonment/recovery (A/R) cable winch 362 are attached on diagonal aft beams 363p, s which are mounted at the bottom ends thereof on base side beams 365p, s. Fore positioned diagonal beams 366p, s are also mounted on the base side beams 365p, s.

A pipe aligner clamp 367 is also positioned within the pipeline opening 368 which is formed by an open box structure 369 constructed of I-beams 369a, f, p, s (FIG. 11). A pipe aligner double clamp set 370 is pivotally attached by connection 372s and 372p to the interior of the frame members constituting the pipe take-off structure 30. The pipe aligner clamp set has two hydraulic rams 374 and 376 which are coordinated to operate a clamp about the rigid walled pipelines in order to align the same. The two hydraulic rams can be utilized for positioning and aligning the rigid walled pipes or other operational lines within the opening 368.

PIPE TAKE-OFF SUPPORT CARRIAGE

The support carriage 120 of FIGS. 12–14 has a starboard base longitudinal beam 390 which is connected to fore and aft transverse beams 392 and 394. The port side of these structural beams is connected to a port frame member 396 to complete a generally rectangular frame base construction. Additional intermediate base frame members 398 and 400 (FIG. 13) are provided parallel to the starboard and port beams 390 and 396 Upon this base frame a starboard bearing housing 402 is supported by a series of six structural members 404, 406, 408, 410, 412 and 414 secured at the bottom ends thereof to the above-described frame base members. The bearing housing 402 provides rotational support for the starboard side of axle 116 of the pipe take-off drum 26. A similar port side bearing housing 415 is supported by the six port side structural members 416–426 which are secured at the lower ends thereof to the frame members above described.

The bearing housings 402 and 415 are separated by a distance sufficient to accommodate the drum 26 and the support frame structure 114. If desired these bearing housings may be in the form of cradles from which the drum 26 can be removed for spooling of pipeline. A gusset frame 426 is also positioned between the bearing collars 402 and 415 at the fore end of carriage 120 and contains two hydraulically operated locking pins 428 and 430 for engaging openings in the periphery of the cradle members 260p and 260s in order to secure the same against rotation when mounted between the bearing housings. This gusset frame 426 is constructed of vertical members 427p and 427s and diagonals 429p and 429s. The vertical lengths of the structural supporting members 404–414 and 416–426 are sufficient to accommodate the pipe take-off drum 26.

Also provided on carriage 120 are a series of reinforcement gussets 432, 434, 438 and 440 as shown immediately under bearing collar 402. A similar set of reinforcement gussets denoted as 442 are provided for the port bearing collar 415.

Carriage 120 is mounted for transverse level winding movement of the support frame by roller caster sets 444 and 446 which are positioned on the fore structural member 392. A similar set of roller casters 448 and 450 is connected to the aft base structural member 394.

Additional reinforcing base frame members 452, 454 and 456 are provided as shown in FIG. 14 in order to provide additional rigidity for the base frame. Also a cross beam reinforcement assembly 458 is provided within the gusset bracket 426. Openings 459s and 459p are provided in diagonal supports 429s and 429p for accommodation of hydraulic motor drive gears as described for FIG. 16 below for operational rotation of the support frame structure 114.

Figure 5:
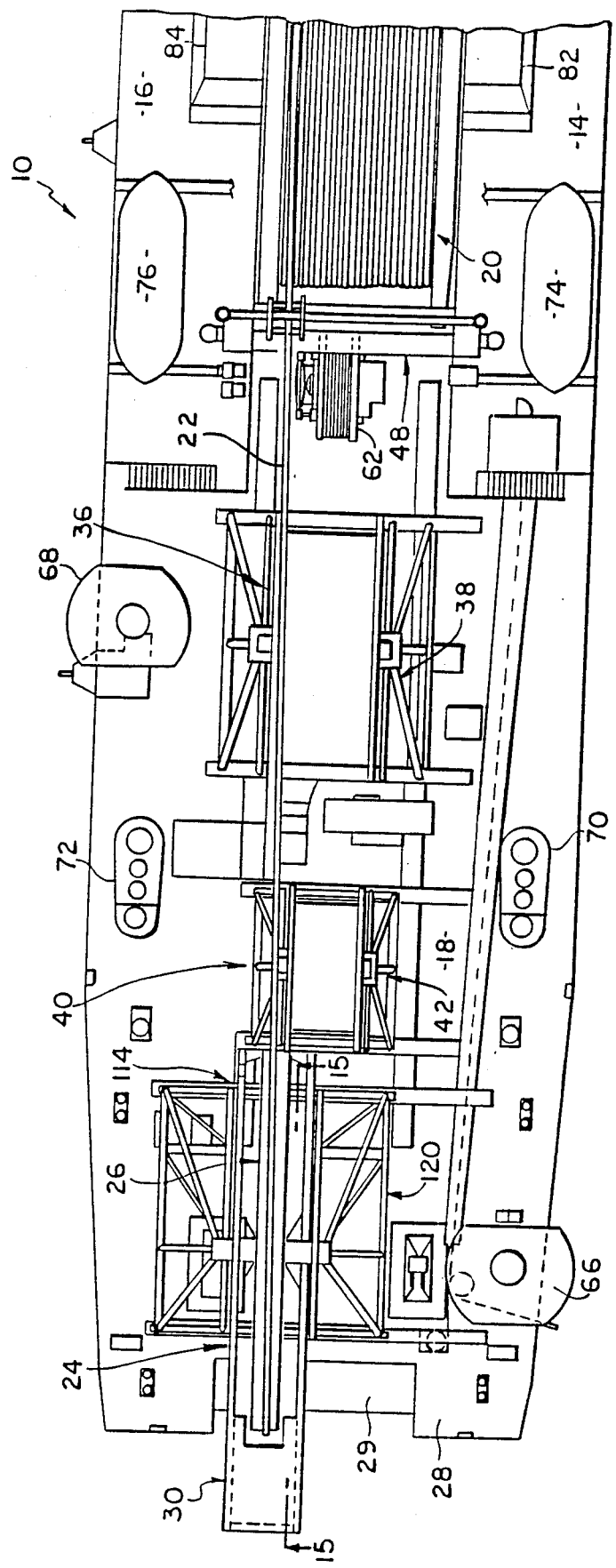
FIG. 5 is a top plan view of the enlarged portion of the vessel of FIG. 4.
Figure 15:
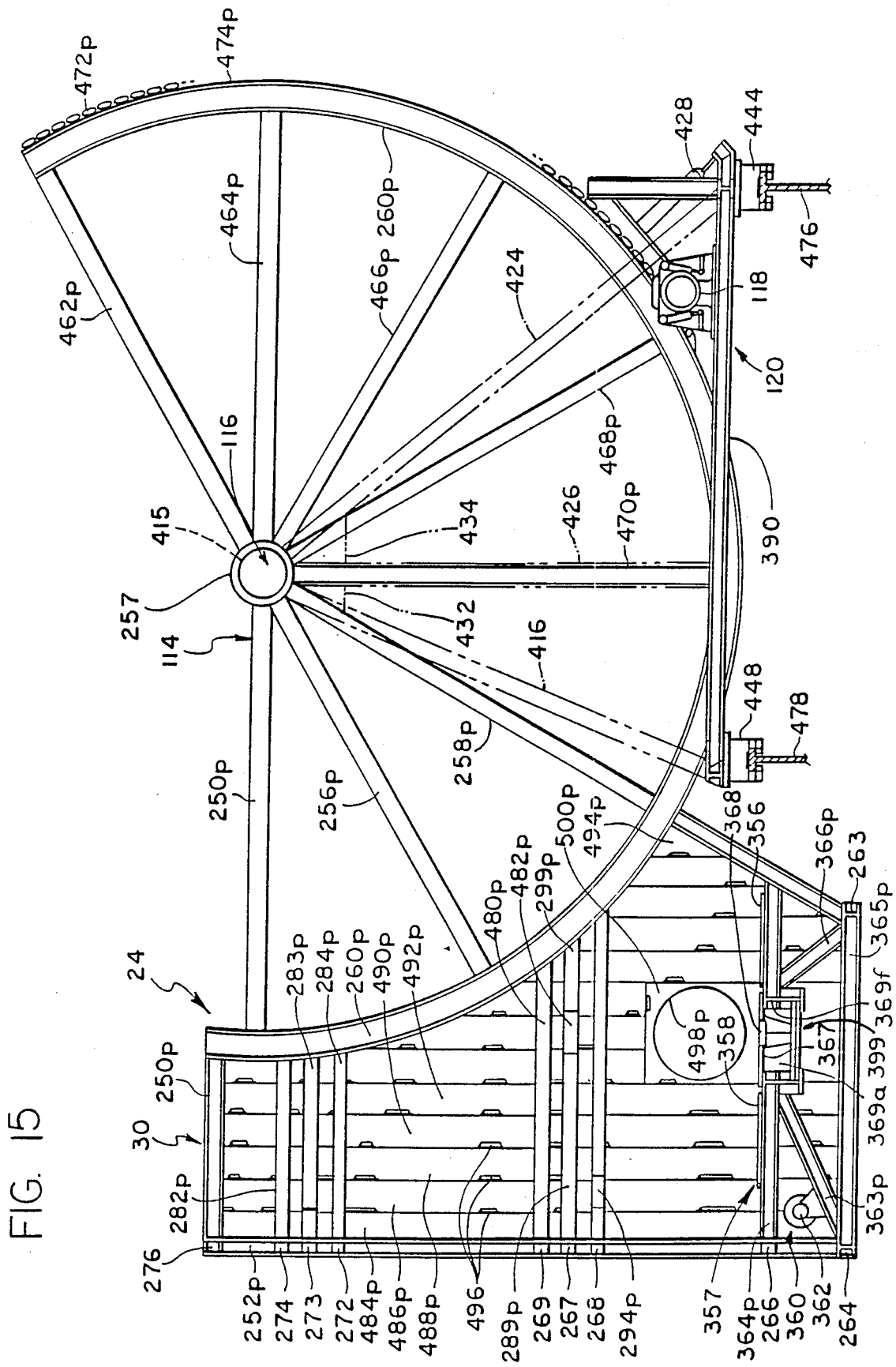
FIG. 15 is a partial cross-sectional side elevation view of the pipe take-off assembly without the take-off drum of the present invention.

The pipe take-off structure 30 and its associated cradle support frame structure 114 of the pipe take-off assembly 24 are shown in FIG. 15 with drum 26 removed. The resulting view is in the nature of a cross-sectional elevation taken on line 15—15 as shown in FIG. 5. The configuration of the frame members of the take-off structure 30 as attached to the arcuate cradle frames 260s, p is shown by this FIG. 15. Structure 30 houses the straightening device 32 and the tensioning device 34 as described with respect to FIG. 8 above.

Frame members within this take-off structure 30 can be extensions of the spoke members 250p, 256p and 259p which are connected by their radial innermost ends to the bearing sleeve 257p which is rotatably mounted on axle 116. A radial spoke member 462p is integrally affixed to bearing sleeve 257p on the opposite side from its connection with frame spoke member 256p. The radial outer end of spoke member 462p is connected to the upper fore end of arcuate frame member 260p. In a like fashion spoke frame member 250p forms an integral connection with the arcuate frame member 260p on its radial outermost end. Additional frame spoke members 466p, 468p and 470p are provided between the bearing sleeve 257p and the arcuate frame member 260p. A sprocket chain track 472p is affixed to the peripheral rim 474p of cradle frame member 260p.

The hydraulic motor 118 is affixed to the support carriage 120 and is fitted with a drive sprocket gear (FIG. 16) which interfits with the sprocket chain 472s in order to rotate the frame structure 114 about the axle 116. The frame structure 114 and the attached pipe take-off structure 30 are thus rotated about axle 116 which is supported by the support carriage 120 and the brace members mounted on the starboard and port sides thereof as described with respect to FIGS. 12–14 above. Thus the support frame structure 114 fits within the space between the bearing collars 402 and 415 in FIGS. 13 and 14 on either side of the drum 26. The port side support braces 416, 426 and 424 of the support carriage 120 are shown in phantom lines.

LEVEL WIND OPERATION OF PIPE TAKE-OFF ASSEMBLY

The support carriage 120 is mounted on transverse support beams 476 and 478 which are affixed to the main deck 18 of vessel 10. These are "T" cross-section beams. The roller supports 444 and 448 are positioned under the carriage 120 and are designed to fit under the top side edges of the "T" configuration of these support beams in order to permit transverse movement of carriage 120 together with the supported pipe take-off structure 30 and the frame structure 114. The configuration of the roller brackets is such that rollers are disposed both on the top surface and below the top portion of the "T" support beam whereby the pipe take-off assembly will not be rolled or pitched off from the support beams 476 and 478 in heavy seas.

Also shown is the fore gusset frame 426 within which is mounted the hydraulic cylinder pin 428 which is designed for entry into openings on the starboard rim 474s of the cradle member 260s in order to prevent rotation of the same from a given fixed working position. A matching cylinder pin 430 is provided for entering openings in the port cradle frame 260p.

Also shown in FIG. 15 are the guide frames 282p, 283p and 284p which provide tracks for the straightener device 32. The intermediate guide frames 283p and 283s are connected by spacers to exterior frames shown as 285p and 285s in FIG. 9. These exterior frames serve to transmit force from the cross brace 273 forward to the arcuate frame members 260p and 260s when the hydraulic rams 306p and 306s are exerting force on the main carriage 308 of the straightener device 32.

In similar fashion exterior frame 480p and an intermediate exterior frame 482p are associated with structural guide set 287p. The intermediate frame pair 482p and s provide for the transmission of force exerted by hydraulic rams 330p and 330s to arcuate cradle members 260p and 260s.

Also shown in FIG. 15 are a series of plating panels 484p, 486p, 490p and 492p which are successively forward positioned up to a triangular panel shape member 494p, which is located in the fore position of the pipe take-off structure 30. A series of openings 496 are provided at locations along the edges of the panel members in order to provide interior lighting for the pipe take-off structure 30 which is of course also lit by known marine lighting devices.

An entry port 498p is provided as shown in mounting panel 500p. This port is used for gaining access to the work floor area 357 via a stair set mounted on carriage 120 (not shown). The pivotal working platforms 356 and 358 are shown in their horizontal down positions in FIG. 15. The subfloor base frame 365 is shown spaced below the support floor frame 364p and the interconnected diagonal braces 363p and 366p.

PIPE TAKE-OFF STRUCTURE ROTATION

Figure 16:
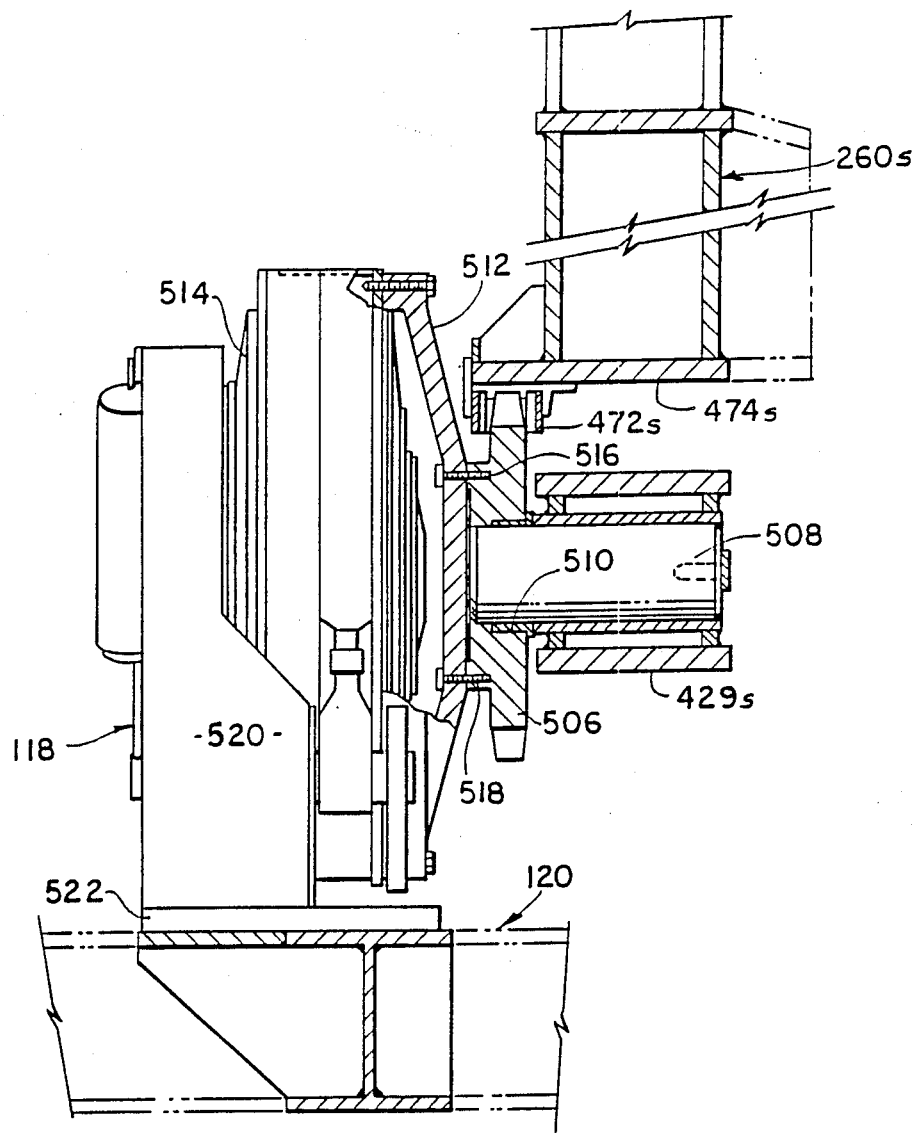
FIG. 16 is a partial cross-sectional view through the hydraulic power drive motor by which the pipe take-off structure is rotated to establish different water entry angles for the pipeline array.

The supporting frame structure 114 of the pipe take-off assembly 24 is rotated into various angular positions by hydraulic motor 118 as shown in FIGS. 15 and 16. A sprocket chain gear 506 interfits with the sprocket chain 472s which is in turn mounted on cradle rim 474s. In the preferred embodiment described herein, only a single hydraulic motor 118 is employed. If desired this hydraulic motor shown in the starboard position with respect to the frame structure 114 can be balanced by a similar hydraulic motor also mounted on carriage 120 on the port side thereof. In this event a second sprocket chain is also utilized on the port edge of the rim 474p.

As shown in FIG. 16 the sprocket gear 506 is fitted with a mounting shaft 508 which is integrally attached within gusset frame member 429s of the gusset frame 426. A bushing 510 provides for rotation of sprocket gear 506 about the mounting shaft 508.

The sprocket mounting adapter 512 of hydraulic motor 118 is designed to rotate within the stationary base 514 to thereby transmit rotational force to the sprocket gear 506 which is interconnected thereto by a series of bolts shown as 516 and 518. The hydraulic motor front bracket 520 is integrally affixed to a pump base 522 which is in turn integrally connected to the carriage frame 120. A usable hydraulic motor 118 is Hagglunds Series 80, Model No. 8385.

The angular rotation of the frame structure 114 about axle 116 in turn controls the position of the operational lines exit port with respect to the stern 28 of vessel 10. This angular positioning controls the water entry angle of the pipeline 22. Higher entry angles up to 90 degrees are used for deep water layouts. The hydraulic cylinder pins 428 and 430 secure the various set positions.

STRAIGHTENING AND TENSIONING DEVICES IN DETAIL

Figure 8:
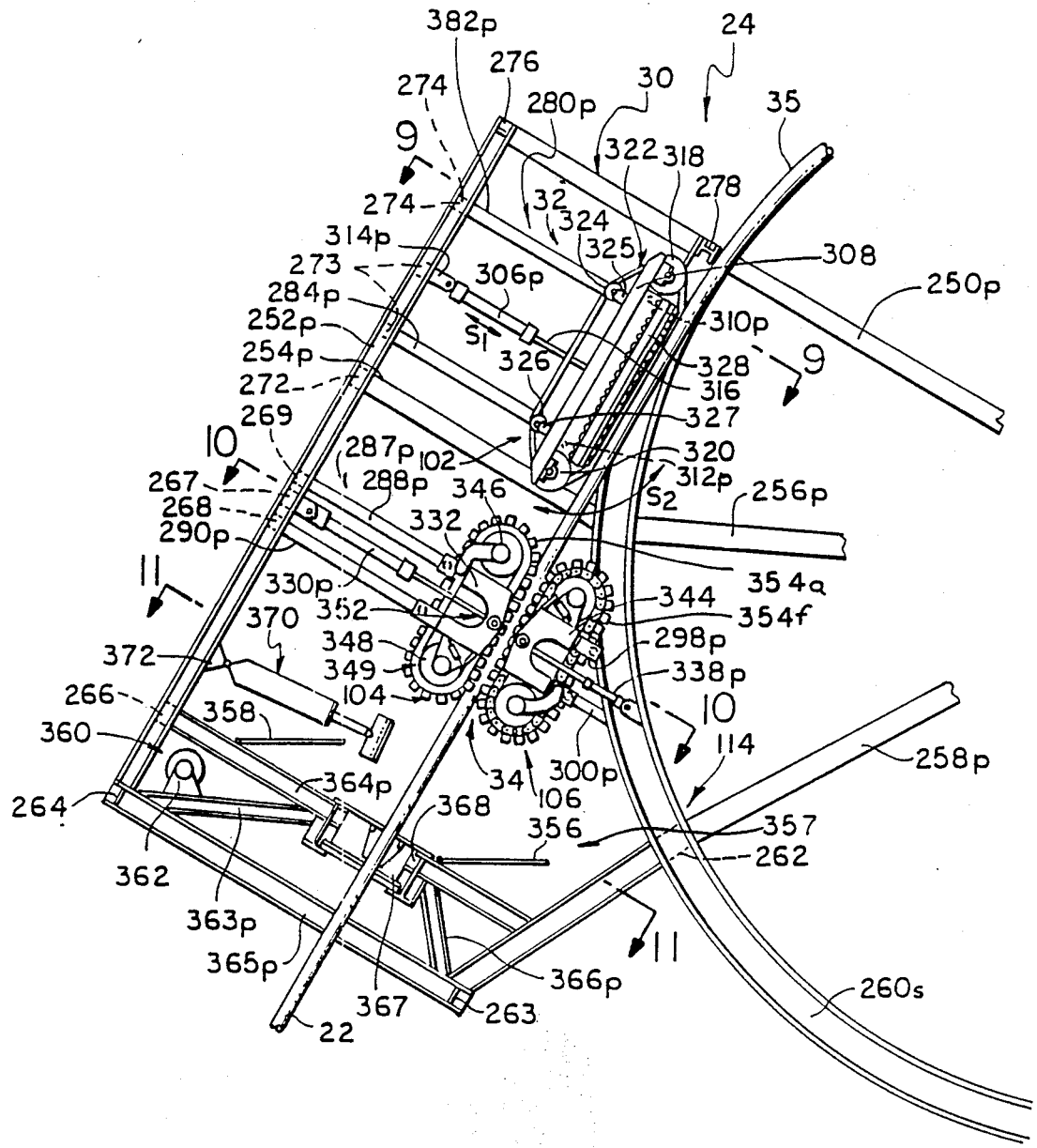
FIG. 8 is a schematic side elevation view of the FIG. 3 embodiment of the pipe take-off structure showing the straightening and tensioning devices in greater detail.

The straightening device 32 shown and described in reference to FIG. 8 can be constructed with the track assembly 102 arranged in one of several configurations. As shown in FIG. 8, the track tensioner idler sprocket gears 324 and 326 can be supported on adjustment mechanisms 325 and 327 as shown for the track 322. It is also possible to provide the tension in track 322 by other slightly modified mechanical configurations as described below with respect to FIGS. 17, 18 and 19.

The track 322 can be arranged with pipeline support pads mounted on a sprocket chain so that the pipeline is contacted at a given position by a single support pad.

The track assembly which first contacts the pipeline 22 after it passes over the pipe take-off drum 26 should be capable of conforming to and maintaining an adjustable curvature in order to provide a straightening function for various sizes of rigid wall pipelines.

A preferred configuration of a straightener/tensioner track assembly which can be used for both a straightening assembly 102 and, with some modification to provide for adequate hydraulic power, also for assemblies 104 and 106 is shown in FIGS. 17-19. In this configuration the sprocket chain tensioner sprocket gears 324 and 326 are mounted by fixed brackets 530 and 532. The desired tension is then exerted on the track set 322 by the powered sprocket gears 318 and 320 which are integrally mounted on axles 534 and 536, respectively, on either end of the assembly 102. Axle 534 is mounted in a bearing housing 538 on the starboard side and in a bearing housing 540 on the port side. These bearing housings 538 and 540 are adjustable linearly away from the support carriage base 308 by means of hydraulic cylinders 542 and 543, respectively. The bearing housings 538 and 540 are slidably mounted in fixed "C" brackets 544 and 546, respectively. Identical bearing housings 548 and 550 are provided on the opposite end of the main housing 328 for rotatably mounting axle 536 and these are slidably adjusted by hydraulic cylinders 552 and 554, respectively, within the "C" brackets 556 and 558.

The "C" brackets are slidably mounted on extensions 560, 562, 564 and 566 of the starboard side plate 568s and the port side plate 568p. Reinforcement studs 570, 572, 574 and 576 are also provided for mounting the "C" brackets.

The operation of the hydraulic cylinders 542, 543, 552 and 554 permit tensioning of the sprocket chain track assembly 322 about the main track carriage 308. This frame consists of sides 578 and 580 which are joined to the starboard and port side walls 568s and 568p in order to complete a box frame structure. Starboard and port side mounting brackets 582s and 582p are also attached to the lateral sides of the main track carriage 308.

Guide roller assemblies 310s, 311s and 312s are shown attached to the mounting bracket 582s. Similar guide roller assemblies 310p, 311p and 312p are mounted on the port side bracket 582p. Guide roller assembly 310s contacts the frame guide member 282s which can be seen in FIG. 9. Similarly roller guide assembly 311s contacts frame guide 283s and roller guide 312s contacts frame guide member 284s. The port side roller assemblies 310p, 311p and 312p contact the corresponding port side frame guide members 282p, 283p and 284p as shown in FIG. 8. Thus, movement of the track assembly 102 toward and away from the pipeline 22 is provided by operation of the hydraulic rams 306s and 306p. The piston rod connection mounts for the hydraulic rams are denoted as 317s and 317p and are formed in the side walls 578s and 578p and also in the mounting brackets 582s and 582p in a centrally disposed location close to the pipeline contacting position.

The use of only two guide roller assemblies on either side of the track assembly 102 which are spaced from the force plane in which the hydraulic rams 306s and 306p function permits a slight rocking motion of the assembly as required to adjust to various pipeline diameters and array configurations. This rocking motion $S_2$ is in addition to the primary sliding, linear movement $S_1$ of the track assembly 102 due to operation of the hydraulic rams 306s and 306p. These motions are shown by the double headed arrows in FIG. 8.

As shown in FIGS. 18 and 19 the main sprocket wheels or gears are positioned at either end of the track assembly 102. This pair of sprocket gears supports a sprocket chain 584 as shown in FIGS. 17 and 19. The sprocket chain 584 when placed about the track assembly 102 then contacts the sprocket gears and 320 (as well as idler sprocket gears 324 and 326 on the stern side when mounted as shown in FIG. 8). The side of the track assembly 102 facing the pipeline contains a series of nine curvature idler rollers 586 which are slidably mounted within the, box frame of the main carriage 308. The mounting arrangement for the curvature idler roller set 586 is provided by placing partition walls 588 and 590 parallel to the other walls 568s and 568p within the box frame. The curvature idler roller set 586 is then slidably mounted within the box frame.

FIG. 19 shows one of the curvature rollers on a mounting frame 592 which is slidably mounted between the partition walls 588 and 590. The mounting frame 592 is connected to an adjustment screw 594 which is in turn controlled by a jactuator 596 which can be adjusted through a side port 598 in side plate 568s and a port 600 in partition wall 588 in order to move the carriage 592 relative to the main carriage housing walls. These walls 568s, 588, 590 and 568p together with the spacer walls 602 and 604 form the curvatured idlers support assembly.

Each of the idlers in the idler roller set 586 is similarly provided with an adjustment screw and a jactuator for adjusting the position of the idlers in order to contact the pipeline with the pipeline support pad 606 as shown in FIG. 19. This individual adjustability feature for each idler roller in the roller set 586 then permits various selected curvatures to be established for each of the operational lines in the array.

The set of jactuators 608 which adjust the position of the set of curvature idlers 586 can be adjusted from either side of the track assembly 102. Ports 610 and 612 are provided in side wall 568p in partition wall 590, respectively, for that purpose. Jactuator operators 614 and 616 as seen in FIG. 19 permit adjustment of jack screw 594. The hydraulic piston rods 316s and 316p are seen connected to the starboard and port sides of the assembly 102 at connections 317s and 317p, respectively.

STRAIGHTENER TENSIONER DEVICES VARIABILITY

A number of degrees of flexibility are provided by the straightener and tensioner devices 102 and 104, respectively, as described herein with respect to FIGS. 8–10 and 17–19. The more significant of these are as follows:

1. The idler roller assembly 586 with its individually adjustable curvature idlers permits incremental changes in curvature of the pipeline 22. As the pipeline comes off the drum 26 these idler rollers and their associated tracks establish the adjusted curvature needed for controlled straightening.

2. The mounting of the track assembly 102 on the parallel guide frames 282s and 282p and on 284s and 284p for reciprocation by the hydraulic rams 306s and 306p via the roller pairs 310 and 312 mounted on either side of the track assembly 102 provides for both a reciprocal movement denoted by the double headed arrow $S_1$ and a slight rocking arcuate motion denoted by double headed arrow $S_2$ (FIG. 8).

3. The intermediate roller pair 311p and 311s provide additional sliding contact within the pipe take-off assembly 30.

4. The track mechanism 322 can be easily removed by retracting the tensioning hydraulic cylinders 542 and 543 as well as the opposing cylinders 552 and 554 in order to remove the tension from the sprocket chain. This chain may then be removed by removal of one or more of the linking pins while the main carriage 308 remains in its position within the pipe take-off structure 30. In this manner the pipe support pads illustrated by the single pad 606 can be exchanged and/or replaced in order to accommodate pipelines having different diameters.

5. It is also possible to operate the track assembly 102 with varying degrees of curvature for contacting the pipelines by reason of the adjustments provided by the jactuator set 608. This is particularly significant with respect to use of two of the straightener assembly 102 as the track assemblies for tensioning device 34.

The arrangement of the pipe straightener device 32 with respect to drum 26 provides the two pipe straightening force zones A and B as described with respect to FIG. 3. The placement of the track assembly 106 below the two force zones A and B permits the use of track assembly 106 to provide a third force zone C. In this manner the drum contributes zone A and the need for a fourth track assembly in order to provide one of the force zones is eliminated thus reducing the capital cost of the pipe take-off assembly 24.

Another advantage of the straightener device 32 and the tensioning device 34 in the locations shown in FIGS. 3 and 8 with respect to drum 26 is that only a few mechanical devices are required for providing both pipe straightening and tensioning. This configuration permits the contacting of the pipeline 22 by the straightening device 32 prior to engagement of the array by the tensioning device 34. This permits the proper functioning of the tensioner device 34 which must be operated in order to have the same force exerted on both sides of the pipeline 22. When the zone B primary pipeline straightening force is exerted by one of the two tensioning devices this equalization of tensioning force is more difficult to control since zone B balances the zone A and B forces. Therefore, it is preferred and operationally significant to have the pipeline contacted by the straightener device 32 as it is unspooled and taken off the pipe take-off drum 26 prior to contact with the tensioner device 34.

AUXILIARY REEL STRUCTURE

Figure 20:
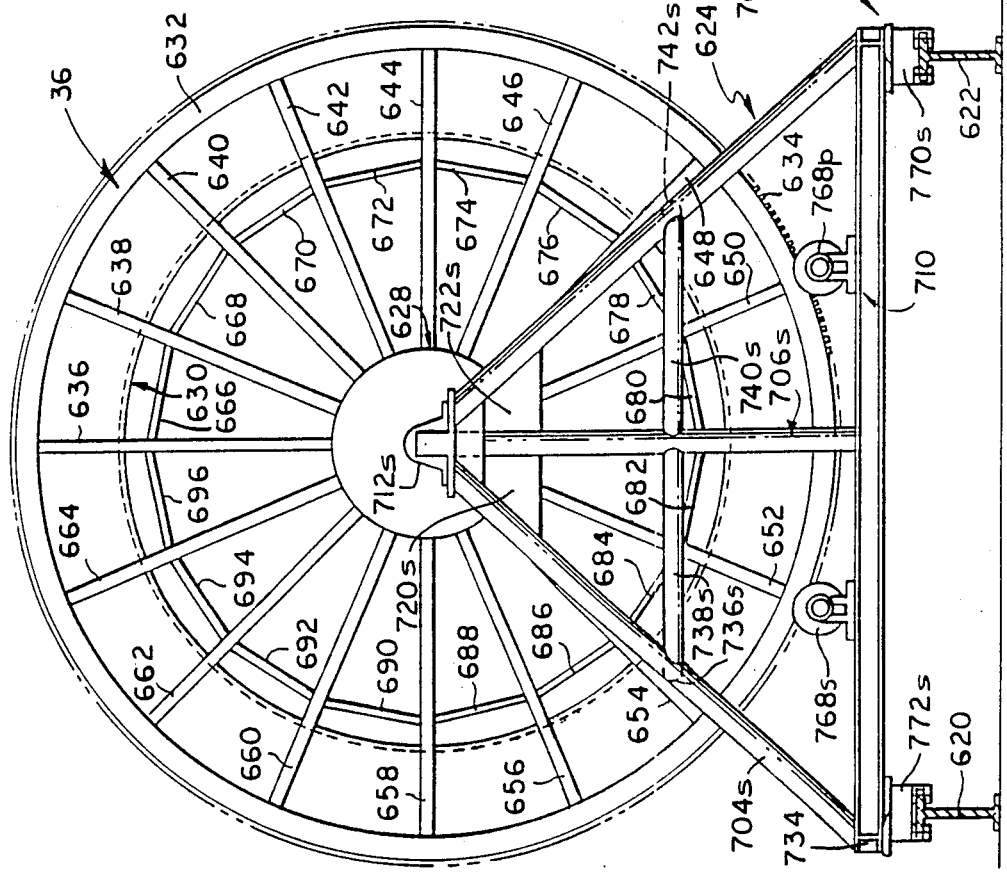
FIG. 20 is a side elevation view of one of the auxiliary reels and its support frame structure when mounted on the vessel deck.

Auxiliary reel 36 can have a fixed position near the longitudinal centerline of the vessel 10. It can be supported by transversely deck mounted base I-beams 620 and 622 as shown in FIG. 20. A level wind track assembly is not required since the pipe take-off assembly is mounted for transverse level winding. The operational line 44 is not required to be taken off the reel 36 along a longitudinal plane since a small fleet angle can be tolerated. The reel is supported on the base beams 620 and 622 by the reel support structure 38 which is formed by two A-frames 624 and 626 which are described in detail below.

The second auxiliary reel 40 is similarly mounted on main deck 18 by two support frames which are similar, but of slightly less reinforced construction than the A-frames 624 and 626.

Figure 21:
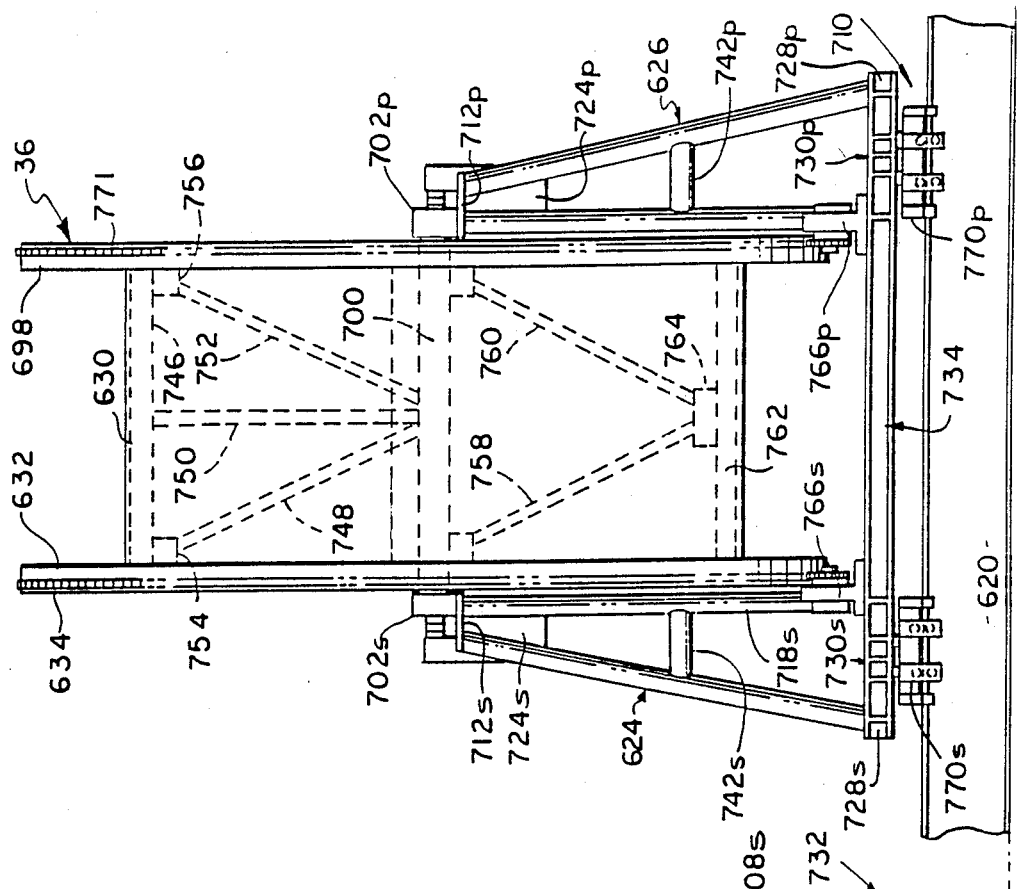
FIG. 21 is a front plan view of the auxiliary reel shown in FIG. 20.

Auxiliary reel 36 and the associated frame supports 620 and 622 are illustrated in FIGS. 20–21. The reel 36 is constructed with a central hub 628 and an outer storage drum 630 on which a single wound operational line or pipeline is reeled for storage. The outer reel flanges are illustrated in FIG. 21 by the starboard side flange 632 which has a continuous sprocket chain 634 affixed to the periphery thereof. A series of spoke frames 636–664 are provided for connecting the inner hub 628, the storage drum 630 and the side rim 632 in order to form the reel 36. As shown, circumferentially arranged reinforcing members 666–696 are connected at intermediate positions between the central hub 628 and the side rim 632.

As shown in FIG. 21, the side rim 632 is spaced from the corresponding port side rim 698 by the width of the storage drum 630. The reel 36 is mounted on an axle 700 which is provided with axle bearing housings 702s and 702p. The starboard and port axle bearing housings are, in turn, mounted on the reel frame supports 620 and 622, respectively. The starboard reel frame 624 is formed by triangularly arranged frame members 704s, 706s and 708s, the fore and aft of which are inclined from the frame base 710 upwardly toward a pedestal plate 712s which provides the foundation for the axle bearing housings 702s as shown in FIG. 21. This exterior set of slanted frame members 704s, 706s and 708s are matched by an interior set of inner frame members 714s, 716s and 718s which are positioned in the vertical plane. All of these reel support frame members are connected at their bottom ends to the reel support frame base 710. In order to reinforce the starboard support reel frame 624, side gussets 720s and 722s, as well as end gussets 724s and 726s are provided within frame 624 immediately below the bearing housing 702s. Similar gussets are provided on the port side.

By projection to FIG. 21 it can be understood that the same reel support frame construction is employed on the port side of reel 36 by means of support frames 704p, 706p and 708p on the exterior of the support frame and elements 714p, 716p and 718p on the interior position. The port side frame supports a bearing pedestal 712p.

The reel support frame base 710 is in a flat frame configuration with starboard and port I-beams 728s and 728p disposed on the outer sides with reinforcing I-beam sets 730s and 730p spaced to the interior thereof. These I-beams are connected on the fore end by transverse fore I-beam 732 and aft transverse I-beam 734. Additional reinforcing frame pipes can be provided in a transverse positioning in order to interconnect the longitudinally aligned I-beam sets 728s,p and 730s,p. Diagonal reinforcing pipe frames can also be provided in the same base plane.

Support frames 624 and 626 have additional reinforcing pipes 736s, 738s, 740s and 742s positioned at an intermediate height as shown in FIG. 20. Similar intermediate reinforcing pipes are provided for the port support frame 626.

Internal reinforcement members are provided for the drum 630 as shown in FIG. 21. Cross support beams illustrated by beam 746 are provided for each pair of frame spokes which are illustrated by the starboard spoke set 636–664. For each of the cross beams 746 a set of three reinforcing struts 748, 750 and 752 are provided for connecting the drum 630 with the central axle 700. Internal reinforcing corner blocks 754 and 756 are also provided in this construction. Opposite each such 3-strut reinforcement brace configurations in the reel 36 is a two member reinforcement brace consisting of struts 758 and 760 which are connected at their outer ends to a cross frame member 762 via a connector block 764 and at their inner ends to the axle 700. This internal reinforcement provides for a reel 36 having sufficient bearing strength to support a load of spooled rigid walled pipeline as an operational line.

A similar internal reinforcement arrangement is preferably provided for the auxiliary reel 40.

FIGS. 20 and 21 illustrate the use of four hydraulic motors 766s and 766p on the fore side of the reel 36 and 768s and 768p on the aft side. These hydraulic motors are arranged to contact to sprocket chains 634 and 771 which are positioned on the side rims of the flanges 632 and 698. These hydraulic cylinders and their associated sprocket chains operate similarly to hydraulic motors and sprocket chains which are provided for the same purpose on the reel 40.

The hydraulic motors 766s,p and 768s,p are mounted on the base frame 710 of the reel support frame 624 and 626.

Upon operation of the hydraulic motors 766s,p and 768s,p in order to rotate the reel 36 in a clockwise direction as shown in FIG. 20, a pipeline can be reeled on the storage drum 630. During the spooling operation the pipeline 44 is run through the pipeline take-off assembly 24. During the unspooling operation the hydraulic systems which provide power to the four hydraulic motors can be operated in order to provide a braking force for the reel 36 in order to provide additional tension for the pipeline 44 which is being paid out over the drum 26 for layout. The same type of braking system can be employed for the hydraulic motors of the other auxiliary reel 40.

Base frame 710 is connected to the transversely positioned I-beams 620 and 622 via four connector clamp assemblies 770s, p and 772s,p.

MAIN REEL LEVEL WIND ASSEMBLY

The main reel level wind assembly 48 is founded on the reel support structures 14 and 16 immediately aft of the main reel 20. As shown in FIG. 22 the mounting bases 776s and 776p are positioned at the aft edge of main reel 20. The assembly towers 778s and 778p have reduced diameter extension portions 780s and 780p about which are mounted a support carriage 782. This carriage is supported between the tower extensions 780s and 780p by a lower transverse frame structure 784 and an upper frame 786. The lower transverse frame 784 has tower extension follower sleeves 788s and 788p which permit vertical sliding movement along the tower extensions 780p and 780s. As seen in FIG. 23, in phantom, the reel 20 is positioned between the two towers 778s and 778p.

The level wind roller carriage 790 contains a set of hourglass starboard pipeline rollers 792s and 794s which are mounted in a box frame 796. This frame is, in turn, mounted between the frame member 784 and transverse top frame 786. A walkway structure 798 is provided below the lower transverse frame structure 784 to permit personnel to adjust the pipeline roller pairs 792 and 794.

The lower transverse frame structure 784 is also connected to the upper frame structure 786 by side supports 795s and 795p. The upper transverse frame member 786 is provided with tower extension coupling rings 800s and 800p to enable sliding movement therealong.

The pipeline roller carriage 790 is mounted for transverse movement between the frame structures 784 and 786 to enable level winding of the carriage in a transverse direction between the towers as denoted by the double headed arrow 802. The level wind arrangement power means employed is a centrally mounted hydraulic motor 804 which operates a jactuator and screw assembly (not shown) which is similar in operation to that shown in FIGS. 20-21 for reel 40.

Adjustment screws are provided for the four pipeline hourglass rollers 792s,p and 794s,p in order to accommodate varying pipeline diameters. Also fore and aft mounted pipeline support rollers 806 and 808 are provided for additional support for the pipeline as unreeled from main reel 20. The main reel level wind assembly is similar to the level wind assembly 560 of U.S. Pat. No. 4,269,540.

In operation, the power winches 810s and 810p located at the mounting bases 776s and 776p of the towers are utilized for raising and lowering the roller carriage 790 along its supporting transverse structures 784 and 786. The exterior mounted winch cables 812s and 812p extend from the winches 810s and 810p upwardly along the outside of the columns and extensions thereto over the double pulley sets 814s and 814p whereby they are attached to the upper frame slide rings 800s and 800p at connections 816s and 816p.

The operation of the winches 810s and 810p permit the entire pipeline roller assembly 790 and its associated transverse structural frames 784 and 786 to be moved vertically along the tower extensions 780s and 780p as shown by the phantom lines in FIGS. 23 to accommodate various wraps of the pipeline as it is spooled.

The main reel level wind mechanism 48 is operated positively through hydraulic motor 804 and power winches 810s and 810p during the spooling operation in order to place the successive wraps on the main reel. The hydraulic motor 804 is not used during unspooling since the pipe take-off assembly 24 is level wound transversely across stern deck 28 to assure correct alignment as the pipeline is unspooled. The pipeline is merely fed through the hour-glass rollers pairs 792 and 794 for additional support against wave motion.

The winches 810s and 810p are used to lower the roller carriage and frames 784 and 786 in a controlled manner as the successive pipeline wraps are unspooled so that the weight of the two frames is not on the pipeline(s).

The level winding provided for the pipeline take-off assembly 24 need not be across the full width of the main reel since a permissible fleet angle of about 1.5° can be accommodated on both the port and starboard sides by the assembly 24. The fleet angle is measured between vertical construction planes positioned parallel to the vessel longitudinal axis and the centerline of a given operation line being unspooled.

TENSIONER TRACK ASSEMBLY

The tensioner track assembly 104 of FIGS. 24-26 was briefly described in relation to FIGS. 8 and 10. The main carriage 332 consists primarily of a front plate 820 and a rear plate 822 (FIG. 26) which are spaced by internal starboard wall 824s and internal port wall 824p. Starboard and port mounting side brackets 826s and 826p are positioned in a central location as shown in FIGS. 24 and 25. These brackets consist of inner and outer space inverted "U" shaped members which are connected to extensions of the spaced plates 820 and 822.

FIG. 25 shows the mounting extensions 827s and 827p for mounting associated bearing housings 828s and 828p. A driven axle 830 is rotatably mounted within these bearing housings and hydraulic motors 346 and 832 are provided on either end thereof in order to supply rotational power. Reaction levers 834s and 834p are fixed to extensions 836s and 836p of the mounting brackets 826s and 826p. Similar mounting extensions 838s and 838p are provided for mounting bearing housings 840s and 840p for providing rotational support for a driven axle 842 which is in turn rotated by hydraulic motors 348 and 844 which have reaction levers 846s and 846p similarly fixed to extensions of the mounting brackets on either side.

The hydraulic motors 346, 348, 832 and 844 are thus arranged to rotate the driven axles 830 and 842 in order to rotate the sprocket drive gear sets 350 and 351 about which the flexible sprocket chain set or track 349 is positioned. As shown in FIGS. 24-26 a single flexible sprocket chain is provided in order to support a series of transverse mounting back up plates illustrated by plates 848 and 850 in FIG. 26. A set of pipeline support pads 852 for engaging the pipeline 22 are affixed to the individual mounting plates as shown in FIG. 26. This arrangement is distinguishable from that shown in FIG. 28 below in that the back up plates are not required to extend transversely across the width of the carriage 332. The tracks and support pads have been removed from FIG. 25 for clarity.

The idler roller assembly 352 is formed by five transversely disposed axles having two rollers on each axle. The rollers contact the underside of the flexible sprocket chain set 349. Each of the five axles is independently mounted on adjustment hydraulic cylinders illustrated by cylinders 353s and 353p in FIG. 26. Each of these hydraulic cylinders can also be seen in the FIG. 25 top view.

The side position mounting brackets 826s and 826p are formed with hydraulic ram connection points 854s and 854p through both of the inverted "U" spaced members thereof. Also guide roller assemblies 340s, 340p, 341s, 341p, 342s and 342p are provided for sliding contact with frame guide members 288s, 288p, 289s, 289p, 290s and 290p inside of structure 30 as described with respect to FIG. 8.

Adjustment in tension of the flexible sprocket chain set 349 can be made by the individual hydraulic cylinders 353s and 353p and also by the adjustment hydraulic cylinders 856s and 856p which operate to move driven axle 830 with respect to the main carriage 332. Similar adjustment hydraulic adjustment cylinders 858s and 858p are used for mounting the bearing housings 840s and 840p respectively for moving the driven axle 842 with respect to the main carriage 332. An additional adjustment hydraulic cylinder 860s and 860p can be provided on either side of driven axle 842 in order to provide for minor advancement adjustments in the sprocket chain track 349 during operation.

The tensioner track assembly 104 described with respect to FIGS. 24–26 above is usually designed so that each of the adjustment cylinders illustrated by 353s and 353p in FIG. 26 for each of the five idler roller axles operate at the same hydraulic pressure and therefore are subject to the same force exertion and position. This action together with the rather short distance from one end of the roller assembly 352 to the other in the direction of track travel means that this type of tensioner assembly is not designed for curvature adjustment. Also the adjustment dimensions for movement of the axles with respect to the mounting plate 820 is too small to accommodate curvature adjustments of the type described with respect to the straightener assembly 102 in FIGS. 17–19 above. For these reasons, the tensioner track assemblies 104 and 106 as shown in FIG. 8 are utilized solely for providing tension to the pipelines as they are sequentially passed through the pipe handling equipment. These are not usable for straightening since they do not permit curvature adjustment of the type required for use in the laying devices described herein.

PIPE TAKE-OFF ASSEMBLY WITH STRAIGHTENER/TENSIONER DEVICE

Figure 27:
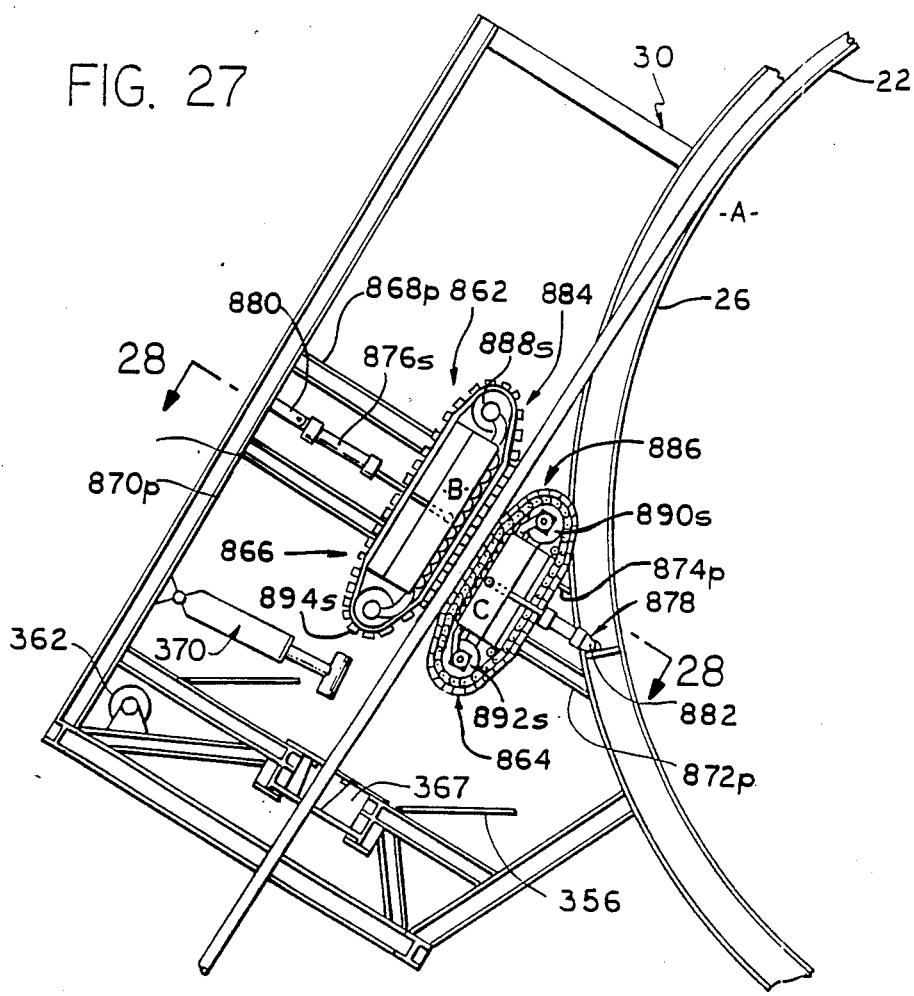
FIG. 27 is a schematic side elevation view of a second embodiment of the pipe take-off structure of the present invention showing the internal position of the straightening/tensioning assemblies.
Figure 28:
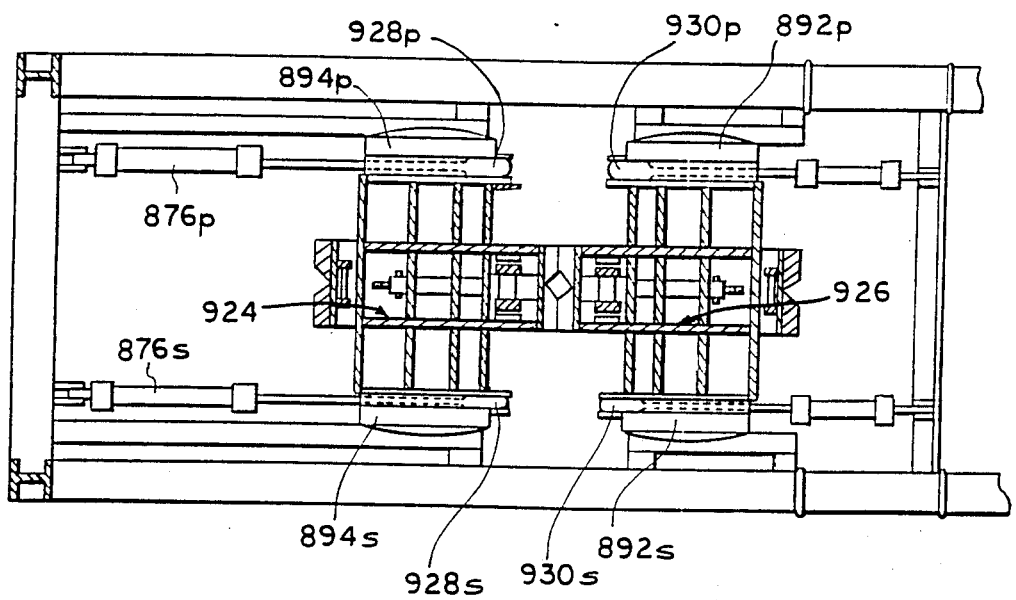
FIG. 28 is a detailed cross-sectional view of the straightening/tensioning assemblies shown in FIG. 27 taken on lines 28—28.
Figure 29:
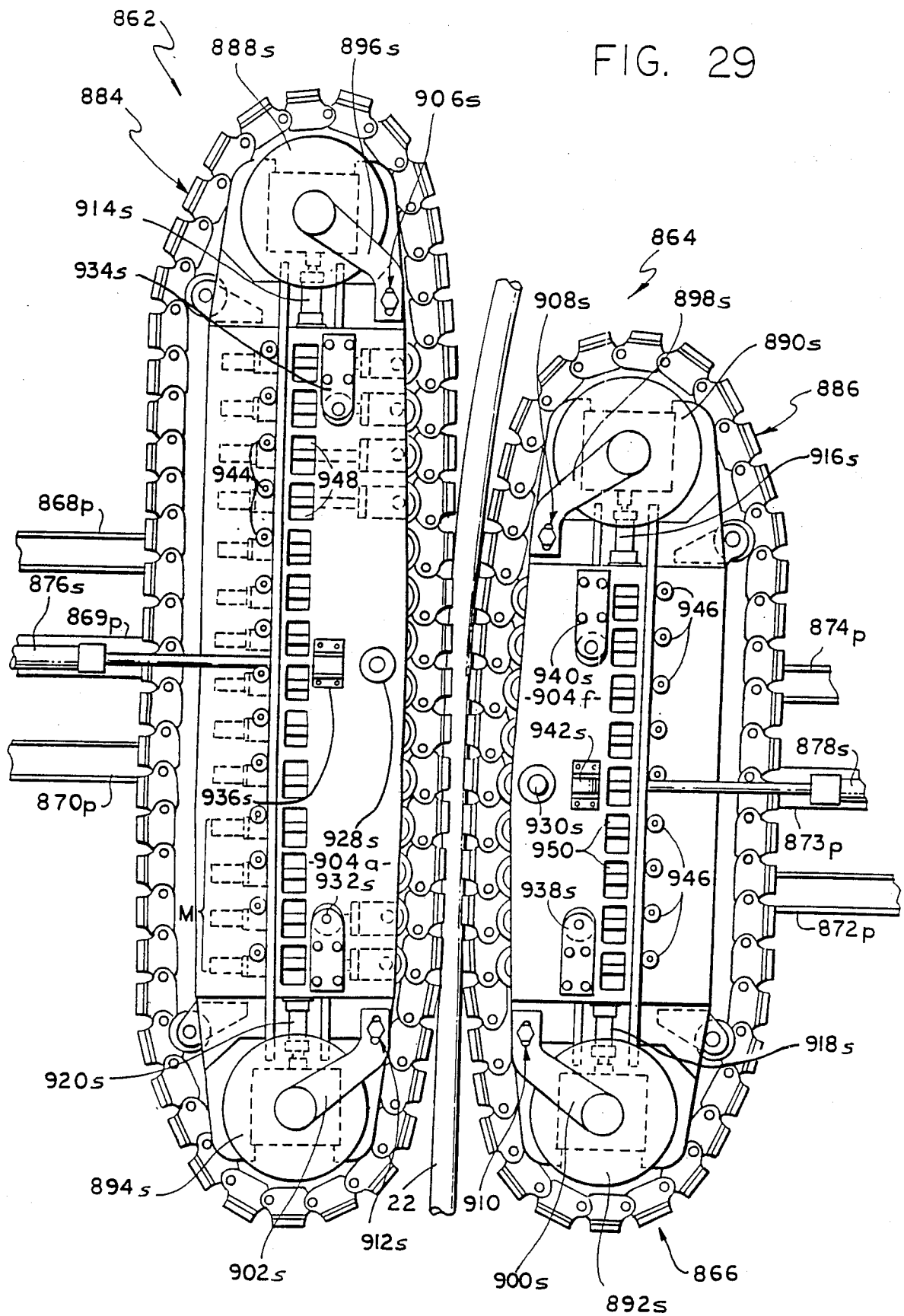
FIG. 29 is a detailed side elevation view of the straightening/tensioning assemblies of FIGS. 27 and 28.

A preferred form of the present invention with respect to operating efficiency and capital costs minimization is shown in FIGS. 27–29.

This modification of the straightener/tensioner device has the advantage of permitting the layout of pipelines sequentially from a plurality of storage reels at lower than expected capital and operating costs.

In this modification the straightener/tensioner track assembly has the capability of imparting an adjustable curvature to the pipelines. The device is fitted with hydraulic motors in order to exert tension on the pipeline. Thus, the adjustable curvature established by the idler roller assembly provides a pipeline straightening function and the use of hydraulic motors to power the sprocket chain track provides a tensioning function. By use of this new type of straightener/tensioner assembly only two opposing assemblies are needed to constitute a straightening/tensioning device which can then be positioned within the pipe take-off structure 30. The drum 26 provides the first force imposition zone A while the racks 1042 and 1044 provide zones B and C as illustrated in FIG. 36. Due to the curvatures which can be established in the tracks the latter two zones can be adequately spaced from one another.

The pipeline 22 is moved over the pipe take-off drum 26 shown in FIG. 27 prior to its entry between the two opposing straightener/tensioner track assemblies 862 and 864 which constitute the straightening/tensioning device 866. The aft mounted assembly 862 which provides for the force B straightening zone is approximately 50% longer than assembly 864 in a direction parallel to the pipeline pathway. Each of the straightening/tensioning assemblies 862 and 864 are slidably mounted on starboard and port structural guides illustrated by guide members 868p and 870p for assembly 862 and members 872p and 874p for assembly 864.

As set forth with respect to FIG. 8, hydraulic ram pairs 876 and 878 are pivotally connected by upstanding connectors 880s,p and 882s,p in order to provide adjustment in positioning for the straightening/tensioning assemblies. The engagement of guide rollers on the structural members 868p, 870p, 872p and 874p is the same as described with respect to the embodiment illustrated in FIG. 8. Also intermediate structural members corresponding to 289s,p of FIG. 15 are used in this modification.

The remaining pipe handling equipment such as the pipe aligner double clamp set 370, the pivotal floor panels 356 and 358, the A/R winch 362 and pipe clamp 367 are the same as described with respect to FIG. 8 and hence the same numeral designations have been employed.

The tensioning function of the straightening/tensioning device 866 requires the use of motive power for the pipeline contacting tracks 884 and 886. This traction power is provided by eight hydraulic motors which are mounted on the two ends of each of the four main axles in the straightening/tensioning device 866. The starboard set of these hydraulic motors are shown as 888s, 890s, 892s and 894s in FIG. 27.

FIGS. 28 and 29 illustrate in greater detail the straightening/tensioning device 866. The two assemblies 862 and 864 which comprise device 866 are of identical construction. In view of the identical construction only a single set of identifying numerals has been employed for the same elements in the two assemblies except that the designations "a" for aft and "f" for fore have been used to designate the operating position of the assembly under description. The framing members of the pipe take-off structure 30 are the same as those described in detail with respect to FIG. 8.

STRAIGHTENING/TENSIONING ASSEMBLIES

The straightening/tensioning assemblies 862 and 864 are similar in basic construction to the straightening assembly illustrated in detail in FIGS. 17–19 with the important difference that hydraulic motors are provided for straightening/tensioning assemblies 862 and 864 for driving the main axles which are best illustrated in FIG. 18 as 534 and 536. The motive power for each of the assemblies is provided by the four hydraulic motors described and illustrated in detail in FIGS. 28 and 29. Reaction levers 896s, 898s, 900s and 902s are provided for connecting the stationary bases of the hydraulic motors to the assembly starboard and port side mounting brackets 904a and 904f as illustrated in FIG. 29. The connection of these lever arms 896-902 with the assemblies is through slot and pin connections 906s, 908s, 910s and 912s, respectively, in order to allow for adjustments in tensioning of the tracks 884 and 886 by the hydraulic pistons 914s, 916s, 918s and 920s.

In operation the relative positions of the two assemblies 862 and 864 are adjusted by operation of hydraulic cylinders 876s and 878s which are shown in FIG. 29 in front of the support frames 869p and 873p, respectively. A pipeline 22 can then be passed downwardly by rotation of the pipe take-off drum 26 and thence through the device 866. Upon activation of the hydraulic ram pairs 876 and 878 the two assemblies 862 and 864 can be closed on either side of the pipeline so that it is pressed between the opposing line support pads which are mounted on the endless sprocket chain tracks 884 and 886 as shown in FIG. 29. As in FIGS. 17-19 the two straightening/tensioning assemblies are connected at the port and starboard sides of each of the main carriages 924 and 926 by pivotal connections 928s, p and 930s, p, respectively.

As is shown in FIGS. 17-19 guide rollers 932s and 934s are positioned to support assembly 862 on the frame tracks 868s and 870s which can be seen in FIG. 29. The central positioned guide roller 936s is positioned in contact with the intermediate structural frame members 869s. Corresponding guide rollers 938s, 940s and 942s are provided on the starboard side bracket 904f.

The internal structure of each of the assemblies is the same as described with respect to FIGS. 17-19. A series of jactuator adjustment openings 944 and 946 are shown in assemblies 862 and 864, respectively. These jactuator adjustments permit the turning of internally mounted jack screws in order to position the multiple roller guides independently. As shown in FIG. 29 fourteen (14) roller guide sets are provided for the aft assembly 862 since it takes up the straightening forces at zone B. Nine (9) roller guide sets are provided for the fore assembly 864. For a marginally lower cost assembly 862 the lower 5 to 6 roller guide sets can be omitted as shown by section M since the pipeline 22 has been sufficiently straightened in the top one-half of the assembly. Sight openings 948 and 950 are also provided through the various walls of the two assemblies to check on rotation of the jactuator screws therein.

The operation of the straightening/tensioning device 866 permits the two assemblies 862 and 864 to be opened and closed about the pipeline via the hydraulic ram pairs 876 and 878 whereas operation of the internal hydraulic cylinder pairs 914, 916, 918 and 920 allow the tension on the endless tracks 884 and 886 to be changed. The track curvature necessary to impart the straightening function while minimizing the pipeline ovality by this novel straightening/tensioning device 866 is established by the mechanical adjustment of the individual screw jacks in order to set the guide rollers at the selected straightening positions for the pipeline.

The tensioning function is provided by motive force input through the hydraulic motors 888s,p; 890s,p; 892s,p; and 894s,p which are connected to the main axles as described above. The input power from these motors permits the tensioning along the pipeline in an upward direction as shown in FIG. 29 in order to maintain desired operating tension on the pipeline which passes downwardly through the pipe array clamp 367 and then into the water.

MODIFICATIONS OF PIPELINE LAYING AND VESSEL

Figure 30:
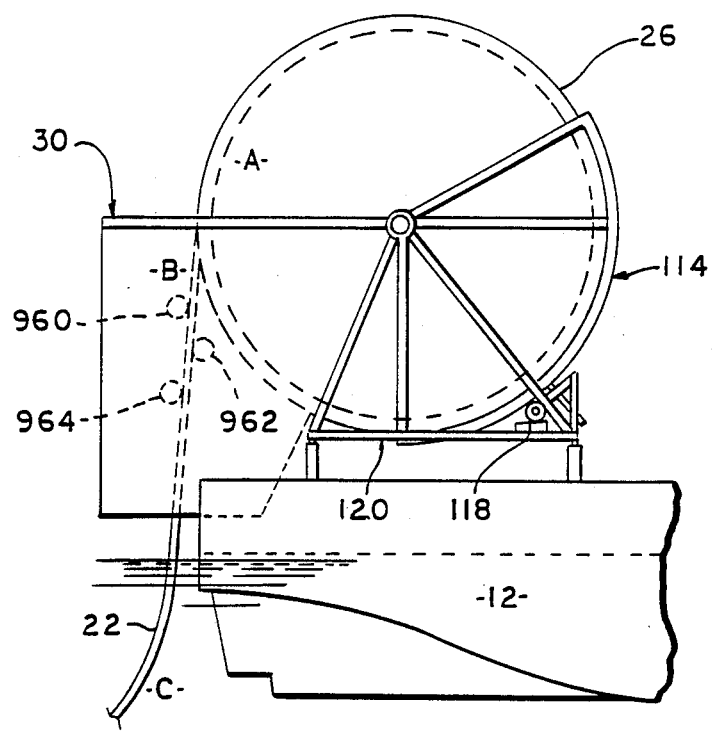
FIG. 30 is a schematic side elevation view of a modification of the pipe take-off structure in which straightening rollers are employed.

In FIG. 30 a modification of the above described pipelaying system and vessel is shown. The straightener and tensioner assemblies of the pipe take-off structure 30 can be replaced by straightener wheels 960, 962 and 964 as shown. For certain deep water pipe layouts only a single wheel 960 needs to be provided since a first straightening force at zone A on the pipe take-off drum 26 is counteracted by the force exerted by the wheel 960 at zone B and a third force in the same direction as the force exerted by the take-off wheel 26 is exerted at zone C by the sea floor.

It may however be desirable to move the area for exertion of counteracting force C up to a position within the pipe take-off structure 30 in which case a second roller 962 is provided. The third roller 964 is, in most cases, optional but is useful in handling certain large pipeline diameters of about 8 inch o.d. and above. The rollers 960, 962 and 964 can preferably be configured hour-glass rollers.

Figure 31:
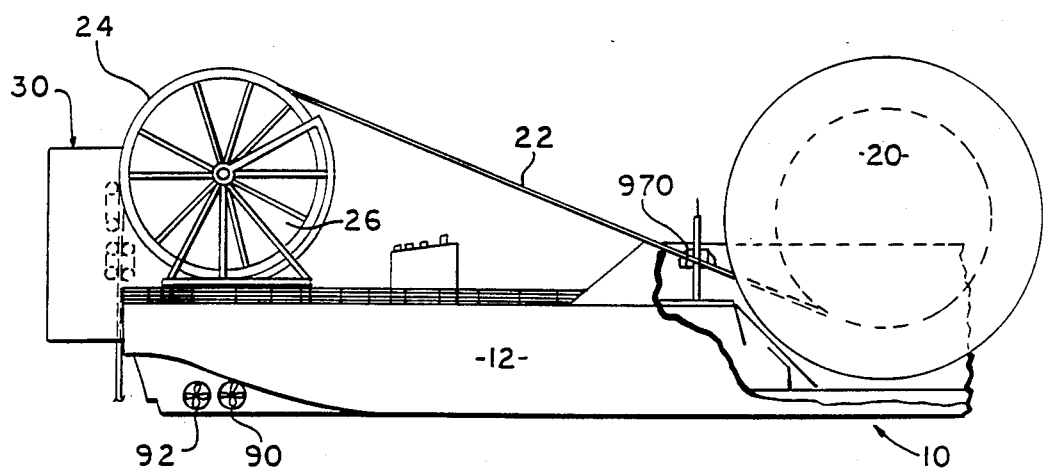
FIG. 31 is a schematic side elevation view of a modification of the pipelaying system shown in FIGS. 1-5.

In FIG. 31 a modification is illustrated in which the pipeline 22 is unspooled from the bottom of reel 20. For this purpose a shortened main reel level wind assembly 970 is provided. Since the height is reduced the tower extensions 780s, p disclosed above with respect to assembly 48 are not required. In other respects the level wind assembly 970 can be as described above. The pipe take-off assembly 24 including the pipeline take-off drum 26 and the pipe take-off structure 30 are as described above.

The modification of underspooling as shown in FIG. 31 has the advantage of reducing the height of the pipeline 22 over its unsupported span from the level wind assembly 970 to the pipe take-off assembly 24. This is advantageous in certain rough sea areas such as in the northern North Sea. Thus the pipeline laying system and vessel described herein can utilize either overspooling as disclosed for the modifications illustrated in FIGS. 1-30 as well as underspooling as illustrated and disclosed with respect to FIG. 31.

The pipelaying system described herein is adapted for laying out single operational lines including rigid walled pipelines onto the bottom of bodies of water varying in depth from about 200 feet to over 3,000 feet. This wide depth range of pipeline layout is accomplished by use of the pipeline laying device which is mounted adjacent the stern of the laying vessel and which is provided with an adjustable positioning pipeline take-off structure so that a range of water entry angles from about 20° to approximately 90° is possible. The pipeline laying device incorporates a pipeline support means which provides simultaneous moving contact for the operational lines during lay out. The preferred form of the pipeline support means is a pipeline take-off drum which is mounted adjacent the stern of the vessel on a support frame structure.

The pipelaying system comprises one or more storage reels 20, 36 and 40 from which operational lines including a rigid walled pipeline can be sequentially unspooled and laid out on the bottom of the body of water by passing each of the operational lines, in turn, through the pipeline laying device. The operational lines can be unspooled from either a top position or a bottom position from their respective storage reels. The pipeline laying device 24 incorporates a pipe take-off structure which is adapted for adjustable positioning in an arcuate direction spaced from the periphery of the pipeline support means in order to establish a range of water entry angles. The pipe take-off structure provides for the placement of pipeline handling means for facilitating pipeline adjustments and connections which are required for commercial pipeline laying. Pipe handling means which are included in the pipe take-off structure 30 can be a work platform as in floor area 357, a pipe clamping means and various positional adjusting equipment.

The vessel upon which the pipelaying system is mounted can be a dynamically positioned vessel having transverse force propeller thrusters mounted on the hull below the waterline. The pipelaying vessel 10 described herein comprises one or more storage reels for operational lines including a rigid walled pipeline as well as the above described pipelaying device.

The pipeline take-off structure 30 also incorporates a straightening device and a tensioning device. The straightening device can consist of a pair of straightening assemblies which incorporate adjustment means for providing individual adjustability to enable the establishment of predetermined curvatures in the facing directions of the assemblies. The straightening assemblies are preferably of a form which have continuous moving tracks with pipeline support pads mounted thereon.

A straightening/tensioning device is described herein which has both individual adjustability for included adjustment means to enable the establishment of predetermined curvatures in the facing direction of the pipeline support track as well as providing for the application of tensioning force longitudinally along the pipeline. This novel straightening/tensioning device is also contained within the pipeline take-off structure.

Both the method of unspooling and laying out a pipeline from the above described pipeline laying system and vessel and the method for spooling the operational lines onto the vessel are described and claimed. Also, a method of converting a single pipeline laying vessel having a main storage reel and a pivotal ramp pipe straightening and tensioning assembly to a vessel which has a main storage reel and a pipeline laying device of the type described herein is set forth. Additionally, the method of reconverting the pipeline laying vessel having the system described herein back to a single pipeline laying vessel having a pivotal ramp straightening and tensioning assembly is set forth.

The level wind apparatus or tower 48 shown in FIGS. 1 and 4 is considered to be optional since it is used only for spooling of rigid walled pipeline onto the reel 20 and additional means such as can be placed in ports are available for conjunctive use with respect to reel 20 for spooling rigid walled pipeline onto vessel 10.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to have secured by Letters Patent of the United States is:

1. A straightening device for use on a reel pipelaying vessel adapted to laying out a single pipeline in a body of water comprising:
    a pair of straightening assemblies adapted for being positioned in opposite facing directions on either side of said pipeline, each of said assemblies adapted for being supported for reciprocal movement toward and away from said pipeline;
    adjustment means mounted within said assemblies and adapted for individual adjustability to enable the establishment of predetermined curvatures in the facing directions of said assemblies;
    said adjustment means adapted for enabling independent serial adjustment of pipeline curvature;
    each of said straightening assemblies comprising a carriage base, an endless chain track positioned therearound, and a series of adjustable guide rollers mounted within said carriage base to enable the establishment of different curvatures in the facing directions of said chain track, with said adjustment means mounted within said carriage base and adapted for enabling independent adjustment of said guide rollers in a direction substantially perpendicular to said pipeline.

2. A straightening device according to claim 1, wherein a plurality of pipeline contacting straightener elements are arranged for being forcibly pressed against the pipeline to establish desired pipeline curvatures, said adjustment means operably connected to said straightener elements.

3. A straightening device according to claim 1, wherein said device is supported within a pipeline laying device adapted for being mounted adjacent the stern of a vessel for use in a body of water.

4. A straightening device according to claim 1, wherein said adjustment means comprise jactuator screw assemblies, said screw assemblies adapted for adjustment from positions spaced along said straightening device to establish different curvatures in the facing directions of said assemblies.

5. A straightening and tensioning device for use in a reel pipe laying system adapted for laying out a rigid walled pipeline in a body of water comprising:
    a pair of endless track pipe straightening and tensioning assemblies adapted for being positioned in opposed facing directions on either side of a pipeline, each of said assemblies adapted for being supported for reciprocal movement toward and away from said pipeline and each of said assemblies comprising a carriage base, an endless chain track positioned therearound, said chain track having a multiplicity of pipeline support pads mounted thereon for providing moving contact support for said pipeline;
    a series of adjustable guide rollers mounted within said carriage base to enable the establishment of different curvatures in the facing direction of said chain tracks of said pair of assemblies;
    adjustment means mounted within said carriage base of each of said assemblies and adapted for enabling independent adjustment of said guide rollers in a direction substantially perpendicular to said pipeline; and
    motive means mounted on at least one of said carriage bases and adapted for enabling the driving of at least one of said endless chain track pairs thereof to exert tension force on said pipeline in a direction substantially parallel to the longitudinal axis thereof.

6. The straightening and tensioning device of claim 5, wherein said adjustment means comprises jactuator screw assemblies, said screw assemblies adjustable from positions spaced along said carriage bases to establish variable positions of said guide rollers in the facing directions with respect to said pipeline for imparting predetermined curvatures to the pipeline.

7. The straightening and tensioning device of claim 5, wherein said pipeline support pads mounted on said chain tracks of each of said assemblies are configured to simultaneously contact said pipeline from two opposite directions.

8. The straightening and tensioning device of claim 5, wherein, within each of said assemblies, said series of pipeline support pads is associated with a series of adjustable guide rollers for enabling the exertion of force through said guide rollers to said pipeline in a direction substantially perpendicular to said pipeline in order to form a predetermined curvature in said pipeline.

9. The straightening and tensioning device of claim 8, wherein drive sprocket gears are mounted on said carriage base for interfitting with said endless chain tracks of each of said pair of assemblies, and motive means for driving said sprocket gears are mounted within said assemblies to enable exertion of tension force on at least one of said pairs of endless chain tracks when said pipeline support pads are in frictional contact with said pipeline to exert tension force on said pipeline in a direction substantially parallel to the longitudinal axis thereof.

10. The straightening and tensioning device of claim 5, wherein said motive means are mounted on each of said carriage bases.

* * * * *